US00RE50591E

(19) United States
(12) Reissued Patent
Walldeen et al.

(10) Patent Number: US RE50,591 E
(45) Date of Reissued Patent: Sep. 16, 2025

(54) NETWORK NODES, A USER EQUIPMENT AND METHODS THEREIN FOR HANDLING A CONNECTION BETWEEN THE USER EQUIPMENT AND A WIRELESS COMMUNICATIONS NETWORK

(71) Applicant: Telefonaktiebolaget LM Ericsson (publ), Stockholm (SE)

(72) Inventors: Thomas Walldeen, Linköping (SE); Håkan Axelsson, Linköping (SE); Stefan Johansson, Linköping (SE); Paul Schliwa-Bertling, Ljungsbro (SE)

(73) Assignee: TELEFONAKTIEBOLAGET LM ERICSSON (PUBL), Stockholm (SE)

(21) Appl. No.: 16/822,773

(22) Filed: Mar. 18, 2020

Related U.S. Patent Documents

Reissue of:
(64) Patent No.: 9,924,460
Issued: Mar. 20, 2018
Appl. No.: 14/892,841
PCT Filed: Oct. 20, 2015
PCT No.: PCT/SE2015/051113
§ 371 (c)(1),
(2) Date: Nov. 20, 2015
PCT Pub. No.: WO2016/068777
PCT Pub. Date: May 6, 2016

U.S. Applications:
(60) Provisional application No. 62/079,821, filed on Nov. 14, 2014, provisional application No. 62/069,382, filed on Oct. 28, 2014.

(51) Int. Cl.
*H04W 48/10* (2009.01)
*H04W 48/02* (2009.01)
(Continued)

(52) U.S. Cl.
CPC ..... *H04W 48/10* (2013.01); *H04W 48/02* (2013.01); *H04W 52/0212* (2013.01);
(Continued)

(58) Field of Classification Search
CPC . H04W 52/0212; H04W 48/02; H04W 48/10; H04W 72/048; H04W 76/10;
(Continued)

(56) References Cited

U.S. PATENT DOCUMENTS 8,934,336 B2 1/2015 Ramachandran et al.
9,288,434 B2 * 3/2016 Bangolae ..... H04L 65/762
(Continued)

FOREIGN PATENT DOCUMENTS

EP 2 557 890 A1 2/2013
EP 2557889 2/2013
(Continued)

OTHER PUBLICATIONS

3GPP TR 23.887 v12.0.0; Technical Report; 3rd Generation Partnership Project; Technical Specification Group Services and System Aspects; Study on Mechanic-Type Communications (MTC) and other mobile data applications communications enhancements (Release 12), Dec. 2013.
(Continued)

*Primary Examiner* — Matthew E Heneghan
(74) *Attorney, Agent, or Firm* — Baker Botts L.L.P.

(57) ABSTRACT

A method performed by a first network node for handling a connection between a wireless device and a wireless communications network. The wireless communications network comprises the first network node.
The first network node stores (705) data related to the connection, and further stores an identifier of the wireless device for locating the stored data related to the connection later.
The first network node further provides (706) the wireless device with a command to transition from a connected mode into a suspended mode, in which suspended mode the connection is suspended and the wireless device stores the data related to the connection, and further stores the iden-
(Continued)

tifier of the wireless device for locating the stored data later in order to resume the connection.

18 Claims, 23 Drawing Sheets

(51) Int. Cl.

| | |
|---|---|
| ***H04W 52/02*** | (2009.01) |
| ***H04W 72/04*** | (2023.01) |
| ***H04W 72/51*** | (2023.01) |
| ***H04W 76/10*** | (2018.01) |
| ***H04W 76/19*** | (2018.01) |
| ***H04W 76/27*** | (2018.01) |
| *H04W 4/00* | (2018.01) |
| *H04W 4/20* | (2018.01) |
| *H04W 4/70* | (2018.01) |
| *H04W 36/00* | (2009.01) |
| *H04W 48/16* | (2009.01) |
| *H04W 76/38* | (2018.01) |

(52) U.S. Cl.
CPC ..... *H04W 72/51* (2023.01); *H04W 76/10* (2018.02); *H04W 76/19* (2018.02); *H04W 76/27* (2018.02); *H04W 4/20* (2013.01); *H04W 4/70* (2018.02); *H04W 36/0033* (2013.01); *H04W 48/16* (2013.01); *H04W 76/38* (2018.02); *Y02D 30/70* (2020.08)

(58) Field of Classification Search
CPC ..... H04W 76/19; H04W 76/27; H04W 76/38; H04W 4/20; H04W 4/70; H04W 36/0033; Y02D 30/70
See application file for complete search history.

(56) References Cited

U.S. PATENT DOCUMENTS

| | | | | |
|---|---|---|---|---|
| 9,332,461 | B2 | 5/2016 | Han et al. | |
| 2004/0203973 | A1* | 10/2004 | Khan | H04L 47/266 455/517 |
| 2006/0007862 | A1* | 1/2006 | Sayeedi | H04L 47/10 370/235 |
| 2007/0097216 | A1* | 5/2007 | Koide | H04N 5/232 348/207.1 |
| 2008/0263213 | A1* | 10/2008 | Kinoshita | H04L 67/2861 709/228 |
| 2009/0197575 | A1* | 8/2009 | Degraeve | H04L 29/1216 455/412.1 |
| 2010/0130233 | A1* | 5/2010 | Parker | H04M 1/72538 455/456.3 |
| 2010/0315948 | A1* | 12/2010 | Yi | H04L 47/10 370/235 |
| 2012/0023506 | A1 | 1/2012 | Maeckel et al. | |
| 2012/0173901 | A1* | 7/2012 | Soliman | H04W 88/182 713/320 |
| 2013/0150126 | A1* | 6/2013 | Pattaswamy | H04W 8/183 455/558 |
| 2013/0208699 | A1 | 8/2013 | Häkkinen et al. | |
| 2013/0260811 | A1* | 10/2013 | Rayavarapu | H04W 76/19 455/509 |
| 2013/0297810 | A1 | 11/2013 | Ho et al. | |
| 2014/0022990 | A1 | 1/2014 | Guo et al. | |
| 2014/0071905 | A1* | 3/2014 | Nimmala | H04W 28/18 370/329 |
| 2014/0080479 | A1 | 3/2014 | Vangala et al. | |
| 2014/0198740 | A1* | 7/2014 | Shinojima | H04L 5/0078 370/329 |
| 2015/0146685 | A1 | 5/2015 | Han et al. | |
| 2016/0082674 | A1* | 3/2016 | Kray | B29C 70/48 415/209.3 |
| 2016/0234774 | A1* | 8/2016 | Vejlgaard | H04W 52/0216 |

FOREIGN PATENT DOCUMENTS

| | | | |
|---|---|---|---|
| EP | 2557889 | B1 | 2/2013 |
| EP | 2645803 | | 10/2013 |
| EP | 2645803 | B1 | 10/2013 |
| EP | 2645804 | | 10/2013 |
| EP | 2645804 | B1 | 10/2013 |
| EP | 3582580 | A1 | 12/2019 |
| WO | WO 2012/050841 | A1 | 4/2012 |
| WO | 2013 155212 | A1 | 10/2013 |
| WO | WO 2014/117854 | A1 | 8/2014 |

OTHER PUBLICATIONS

3GPP TS 36.304 v12.2.0; Technical Specification; 3rd Generation Partnership Project; Technical Specification Group Radio Access Network; Evolved Universal Terrestrial Radio Access (E-UTRA); User Equipment (UE); procedures in idle mode (Release 12), Sep. 2014.

European Extended Search Report with European Search Opinion in European Application No. 23159431.8-1218, dated Apr. 26, 2023.

PCT Notification of Transmittal of the International Search Report and the Written Opinion of the International Searching Authority, or the Declaration for International application No. PCT/SE2015/051113—Feb. 24, 2016.

3GPP TS 36.304 v12.2.0; Technical Specification; 3rd Generation Partnership Project; Technical Specification Group Radio Access Network; Evolved Universal Terrestrial Radio Access (E-UTRA); User Equipment (UE) procedures in idle mode (Release 12), Sep. 2014.

3GPP TS 36.331 v12.3.0; Technical Specification; 3rd Generation Partnership Project; Technical Specification Group Radio Access Network; Evolved Universal Terrestrial Radio Access (E-UTRA); Radio Resource Control (RRC); Protocol specification (Release 12), Sep. 2014.

3GPP TS 36.413 v12.3.0; Technical Specification; 3rd Generation Partnership Project; Technical Specification Group Radio Access Network; Evolved Universal Terrestrial Radio Access Network (E-UTRAN); S1 Application Protocol (S1AP) (Release 12), Sep. 2014.

3GPP TR 23.890 v12.0.0; Technical Report; 3rd Generation Partnership Project; Technical Specification Group Services and System Aspects; Optimized offloading to Wireless Local Area Network 9WLAN) in 3GPP Radio Access Technology (RAT) mobility (Release 12)—Sep. 2013.

PCT Written Opinion of the International Searching Authority for International application No. PCT/SE2015/05111—dated Feb. 15, 2016.

PCT International Search Report for International application No. PCT/SE2015/05111—Feb. 15, 2016.

Supplementary European Search Report for Application No. / Patent No. 15855451.9—1870 / 3213557—Sep. 20, 2017.

* cited by examiner

NETWORK NODES, A USER EQUIPMENT AND METHODS THEREIN FOR HANDLING A CONNECTION BETWEEN THE USER EQUIPMENT AND A WIRELESS COMMUNICATIONS NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY

[This nonprovisional application is] *This patent application is for a broadening reissue of U.S. Pat. No. 9,924,460, which is hereby incorporated by reference in its entirety. U.S. Pat. No. 9,924,406 issued from U.S. patent application Ser. No. 14/892,841,* a U.S. National Stage Filing under 35 U.S.C. § 371 of International Patent Application Ser. No. PCT/SE2015/051113 filed Oct. 20, 2015, and entitled "Network Nodes, A User Equipment And Methods Therein For Handling A Connection Between The User Equipment And A Wireless Communications Network" which claims priority to U.S. Provisional Patent Application No. 62/069,382 filed Oct. 28, 2014 and also claims priority to U.S Provisional Patent Application No. 62/079,821 filed on Nov. 14, 2014, all of which are hereby incorporated by reference in their entirety.

TECHNICAL FIELD

Embodiments herein relate to a first network node, a wireless device, a second network node, a third network node, a system of network nodes and methods therein. In particular the embodiments herein relate to handling a connection between the wireless device and a wireless communications network.

BACKGROUND

Communication devices such as terminals are also known as e.g. User Equipments (UE), mobile terminals, wireless terminals and/or mobile stations. Terminals are enabled to communicate wirelessly in a wireless or cellular communications network or a wireless communication system, sometimes also referred to as a cellular radio system or cellular network. The communication may be performed e.g. between two terminals, between a terminal and a regular telephone and/or between a terminal and a server via a Radio Access Network (RAN) and possibly one or more core networks, comprised within the cellular communications network.

Examples of wireless communications networks are Long Term Evolution (LTE™), Universal Mobile Telecommunications System (UMTS) and Global System for Mobile communications (GSM).

Terminals may further be referred to as mobile telephones, cellular telephones, laptops, surf plates or tablets with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used to denote the transmission path from the base station to the mobile station. The expression Uplink (UL) is used to denote the transmission path in the opposite direction i.e. from the mobile station to the base station.

In 3rd Generation Partnership Project (3GPP) LTE, base stations, which may be referred to as eNodeBs or even eNBs, may be directly connected to one or more core networks and related core network nodes, such as a Mobility Management Entity (MME) and a Serving GateWay (SGW).

The MME is a control node and is responsible for idle mode UE tracking and paging procedure including retransmissions. The MME is involved in the bearer activation/deactivation process and is also responsible for choosing the SGW for a UE at the initial attach and at time of intra-LTE handover involving Core Network (CN) node relocation. The MME is responsible for authenticating the user.

3GPP LTE radio access standard has been written in order to support high bitrates and low latency both for uplink and downlink traffic. All data transmission is in LTE controlled by the radio base station.

The introduction of new types of devices, such as devices that are used for Machine-Type-Communication (MTC), that interact with wireless communications networks put new requirements both on the devices, such as UEs, and the networks. Such new requirements may impose problems, such as shorter battery lifetime for the UEs, and from the network point of view one of the problems is to handle many devices sending small amounts of data.

For example, when a device, such as a UE, wants to send data, it needs to set up a connection towards the wireless communications network. This implies some mandatory steps, e.g. establishing a control connection to the MME through the eNodeB, establishing a secure radio connection on the air interface and configuring data bearers through which data may be sent. FIG. 1 shows a legacy normal service request establishment in LTE when data is to be received or transferred. As can be seen from FIG. 1 there is rather much signaling, i.e. actions 101-114, before the UE sends 115 the payload data to the eNodeB.

The signaling described above consumes much processing resources compared to the data volume being transferred for some devices, such as MTCs. This may then set a limit on how many devices that an eNodeB may handle, or how much other traffic the eNodeB may handle.

One prior art approach is to always have the devices in connected mode, that is e.g. have a control connection towards the MME, a secure radio connection and configured data bearers established all the time. This will however have impacts both on the performance of mobile devices, e.g. in terms of battery lifetime, and also on the performance of the network, since the connected mode consumes network resources. In fact, an eNodeB is normally designed to only handle a certain maximum number of users in connected mode. Since the actual number of devices in the area may be multiples higher than the designed maximum number of users in connected mode this will impose a large limitation.

SUMMARY

It is an object of embodiments herein to address at least some of the problems and issues mentioned above, by providing an improved way of handling a connection between a wireless device and a wireless communications network.

When a connection between the UE, i.e. wireless device, and the network is released in LTE, all contexts in the eNodeB and the related information in the MME and the SGW are released. At the next service request, e.g. when the UE wants to send data, the entire signaling procedure for establishing a connection needs to be performed again. The current way to always establish a new connection leads to much signaling and hence consume much processing resources compared to the data volume being transferred for some devices, such as MTCs.

Instead of releasing an established connection between a wireless device, such as the UE, and the wireless communications network, the wireless device is 'suspended' in embodiments herein. Suspended means that data related to the established connection between the wireless device and the wireless communications network are saved in the wireless device and in network nodes connected to the wireless device, such as an eNodeB, an MME and an SGW.

The data may comprise a UE context, for example a UE context related to security, bearers, Temporary International Mobile Subscriber Identity (T-IMSI) and UE capabilities.

Further, in embodiments herein, instead of establishing a new connection between the wireless device and the wireless communications network when there is new data to be transferred, the previous connection is resumed, or continued, at a later time with the same security context and bearers.

In other words, in embodiments herein the wireless device may be connected to the wireless communications network using the same connection parameters for several sessions of the connection since these connection parameters are saved in the wireless device and in the network nodes during the above suspension of the connection.

The wireless device is in other aspects handled as in 'Idle mode'. Although the wireless device is in other aspects handled as in 'Idle mode', the wireless device may continue a previous session of the connection, i.e. 'resume the previous session' when the wireless device wants to establish a connection towards the network, e.g. when there is new data to be transferred.

The 'Resume' of the previous connection may be allowed within the cell where the wireless device was 'suspended' or in a cell in which information indicating that resume is possible is broadcasted.

According to one aspect of embodiments herein, the object is achieved by a method performed by a first network node for handling a connection between a wireless device and a wireless communications network. The wireless communications network comprises the first network node.

The first network node stores data related to the connection, and further stores an identifier of the wireless device for locating the stored data related to the connection later.

The first network node further provides the wireless device with a command to transition from a connected mode into a suspended mode. In the suspended mode the connection is suspended and the wireless device stores the data related to the connection, and further stores the identifier of the wireless device for locating the stored data later when resuming the connection.

According to another aspect of embodiments herein, the object is achieved by a method performed by a wireless device for handling a connection between the wireless device and a wireless communications network. The wireless communications network comprises the first network node.

The wireless device receives from the first network node a command to transition from a connected mode into a suspended mode.

The wireless device further transitions into the suspended mode. In the suspended mode the connection is suspended and the wireless device stores data related to the connection, and further stores an identifier of the wireless device for locating the stored data related to the connection later when resuming the connection.

According to a further aspect of embodiments herein, the object is achieved by a method performed by a second network node for handling a connection between a wireless device and a wireless communications network. The wireless communications network comprises the second network node and a third network node. The second network node is responsible for paging the wireless device.

The second network node obtains an indication that the connection between the wireless device and the wireless communications network is to be suspended.

The second network node further pages the wireless device in case of a downlink control message is to be transferred to the wireless device or when the third network node has informed the second network node that a payload is to be transferred to the wireless device.

According to a further aspect of embodiments herein, the object is achieved by a method performed by a third network node for handling a connection between a wireless device and a wireless communications network. The wireless communications network comprises the third network node and a second network node responsible for paging of the wireless device.

The third network node obtains an indication that the connection between the wireless device and the wireless communications network is to be suspended.

The third network node further suspends a bearer related to the wireless device in response to the indication that the connection between the wireless device and the wireless communications network is to be suspended. Suspending the bearer comprises buffering downlink payload to be sent to the wireless device using the bearer.

When the third network node has received downlink payload to the wireless device for which the bearer is suspended, the third network node informs the second network node that the third network node has received downlink payload to the wireless device.

According to a further aspect of embodiments herein, the object is achieved by a method performed by a system of network nodes for handling a connection between a wireless device and a wireless communications network. The wireless communications network comprises the system of network nodes. A first network node comprised in the system of network nodes stores data related to the connection, and further stores an identifier of the wireless device for locating the stored data related to the connection later.

The first network node provides the wireless device with a command to transition from a connected mode into a suspended mode. In the suspended mode the connection is suspended and the wireless device stores the data related to the connection, and further stores the identifier of the wireless device for locating the stored data later when resuming the connection.

A second network node comprised in the system of network nodes receives a message from the wireless device. The message indicates a request from the wireless device to resume the connection. The received message comprises the identifier of the wireless device for locating the stored data. The identifier enables the first network node to locate the data related to the connection.

The second network node resumes the connection by transmitting a message to the wireless device. The transmitted message comprises the identifier of the wireless device, and further comprises an indication that a resumption of the connection is complete, whereby the suspended connection between the wireless device and the wireless communications network is resumed using the data related to the suspended connection.

According to a further aspect of embodiments herein, the object is achieved by a first network node configured to perform the above method performed by the first network node.

According to a further aspect of embodiments herein, the object is achieved by a wireless device configured to perform the above method performed by the wireless device.

According to a further aspect of embodiments herein, the object is achieved by a second network node configured to perform the above method performed by the second network node.

According to a further aspect of embodiments herein, the object is achieved by a third network node configured to perform the above method performed by the third network node.

According to a further aspect of embodiments herein, the object is achieved by a system of network nodes configured to perform the above method performed by the system of network nodes.

Since the first network node commands the wireless device to transition into a suspended idle mode, also referred to as a suspended mode herein, in which suspended idle mode the wireless device has stored the data related to the connection, and the identifier of the wireless device for locating the data related to the connection, the wireless device and the wireless communications network are able to resume the connection later.

In other words, since the data related to the connection and the identifier of the wireless device for locating the data related to the connection is stored in the wireless device and in the wireless communications network it is possible to suspend and resume the connection using the data related to the connection.

Embodiments herein enables a faster transition from 'idle' to 'ready to transfer data mode', such as a Radio Resource Control, RRC, Connected Mode. In embodiments herein no round trip communication towards the core network node is needed to set up a connection towards the wireless communications network. This will significantly reduce the time before an uplink packet may be transferred. Note also that the reduced time before an uplink packet may be transferred will be the same when the S1 connection is over satellite, i.e. 20-30 ms compared to 1 s with the current method where a new connection is needed every time new data is to be sent from the UE to the network. Further, when the S1 connection is over satellite, also the time to transfer a DL package from the wireless communications network to the UE is significantly improved, 250 ms compared to 1 s for the current method.

Embodiments herein require less signaling and hence consume less resources on the air interface, in the eNodeB, on an S1-C interface between the eNodeB and the MME, in the MME, on the S11 interface between the MME and the SGW and in the SGW.

By using at least some of the embodiments described herein, considerable advantages may be achieved e.g. for UEs with low mobility which transfer rather small amounts of data at a time. However, benefits can be achieved also in other cases which will be further described below. For example, normal smart phone traffic will gain faster setup times and the underlying wireless communications network will need less processing.

BRIEF DESCRIPTION OF THE DRAWINGS

Examples of embodiments herein are described in more detail with reference to attached drawings in which.

DETAILED DESCRIPTION

Figure 1:
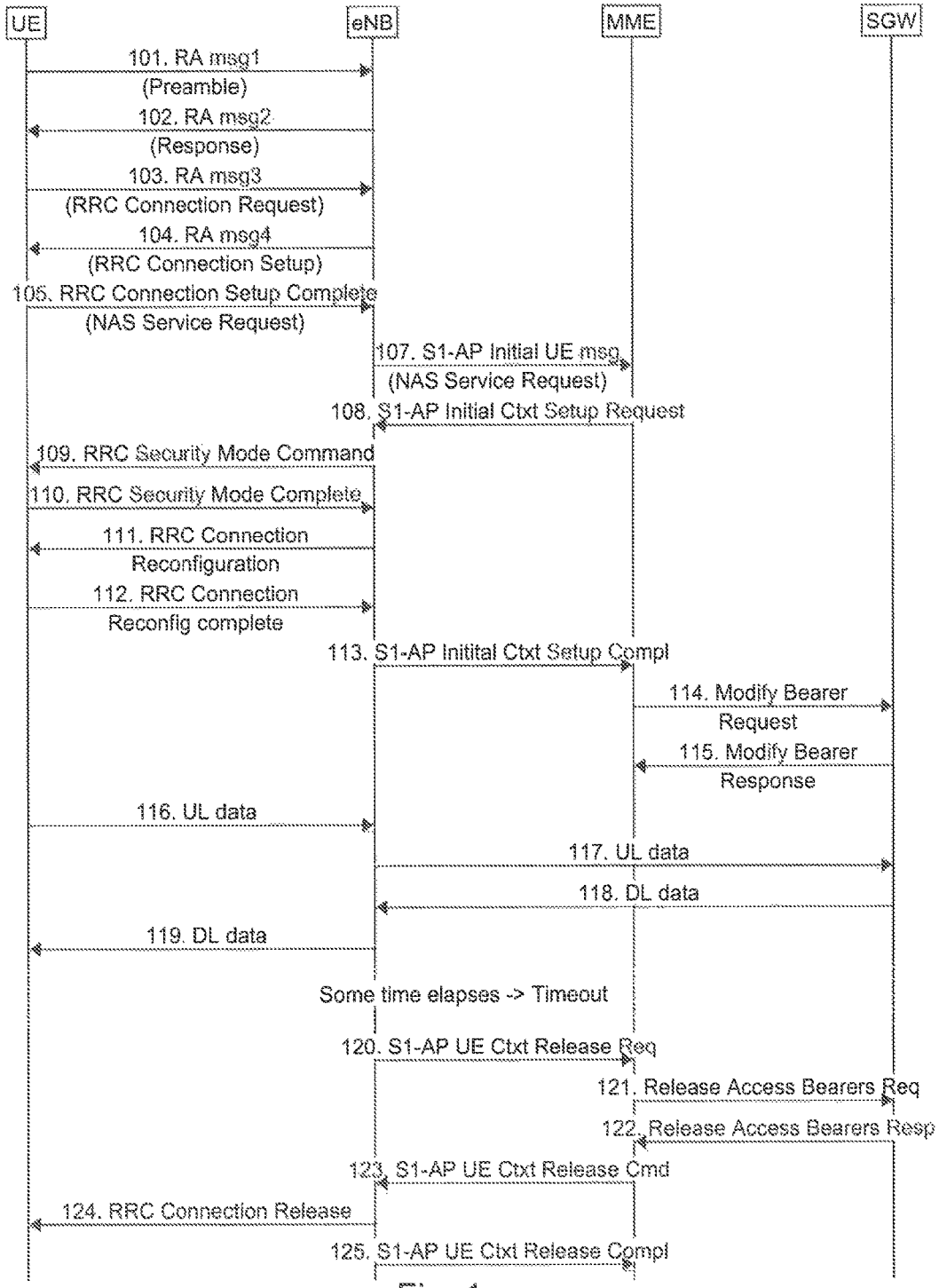
FIG. 1 is a signaling diagram illustrating a method for accessing the wireless communications network according to prior art.
Figure 2A:
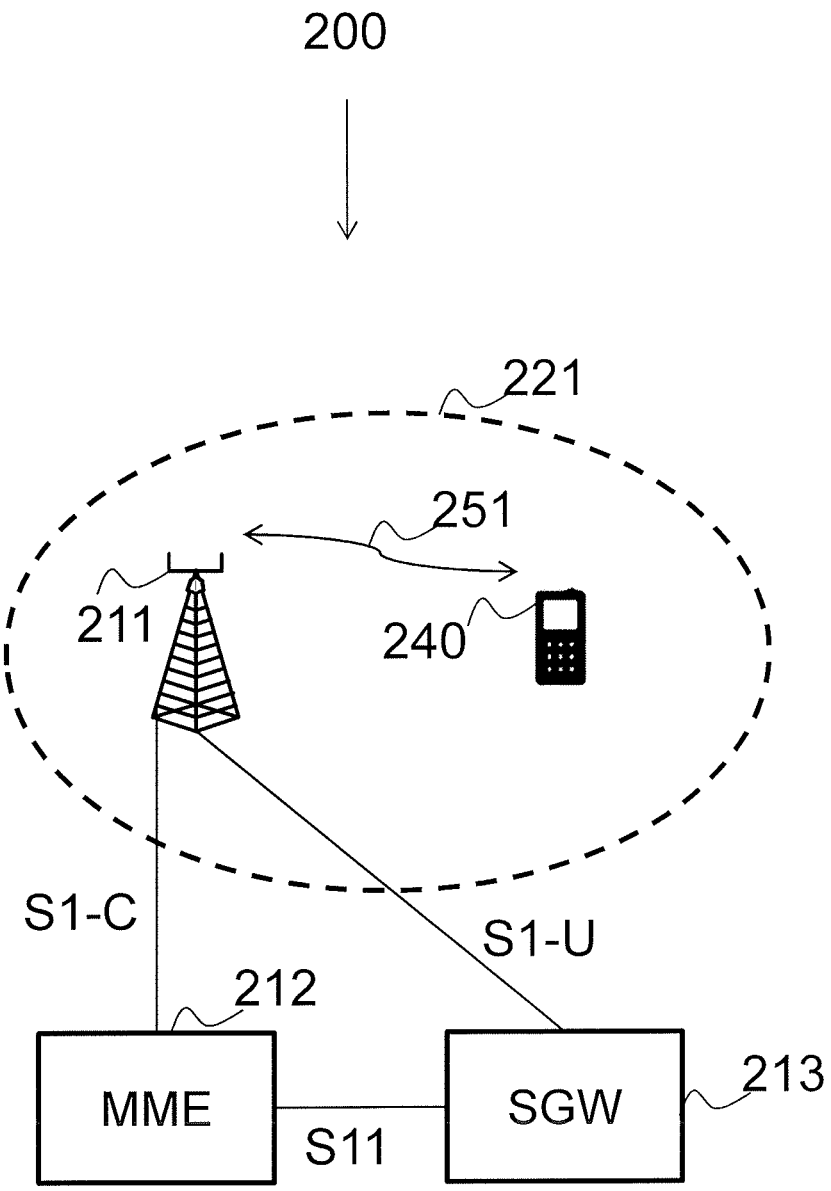
FIG. 2a is a schematic block diagram illustrating a wireless communications network in which embodiments herein may be implemented.

Embodiments herein may be implemented in one or more wireless communications networks whereof FIG. 2a depicts parts of a wireless communications network 200, according to one example. The wireless communications network 200 may for example be an LTE, UMTS, GSM, or any 3GPP wireless communications network, or any cellular wireless communications network or system.

The wireless communications network 200 comprises a plurality of base stations and/or other network nodes. More specifically, the wireless communications network 200 comprises a first network node 211.

The term "network node" may correspond to any type of radio network node or any network node, which communicates with at least a radio network node. For example, the network node 211 may be a base station, such as an eNB. The base station may also be referred to as a NodeB, an evolved Node B (eNB, eNode B), a base transceiver station (BTS), Access Point (AP) Base Station, Wi-Fi AP, base station router, or any other network unit capable of communicating with a wireless device within a cell served by the base station depending e.g. on the radio access technology and terminology used. The network node 211 may also be a Radio Network Controller (RNC) in an UMTS system. In this description, the equivalent term user equipment, UE, will sometimes be used instead of wireless device and these terms are interchangeable throughout the description.

The wireless communications network 200 may further comprise a second network node 212, for example a first core network node such as an MME. The second network node 212 may be a control node and may be responsible for idle mode UE tracking and paging procedure including retransmissions. The second network node 212 may be involved in the bearer activation/deactivation process and may also be responsible for choosing an SGW for a UE at the initial attach and at time of intra-LTE handover involving CN node relocation. The second network node 212 may be responsible for authenticating the user. Embodiments herein are applicable for "MME in Pool", wherein the eNodeB may be connected to a number of MME nodes serving the same cells, or for similar technical solutions.

The wireless communications network 200 may further comprise a third network node 213, for example a third network node such as an SGW.

Figure 2B:
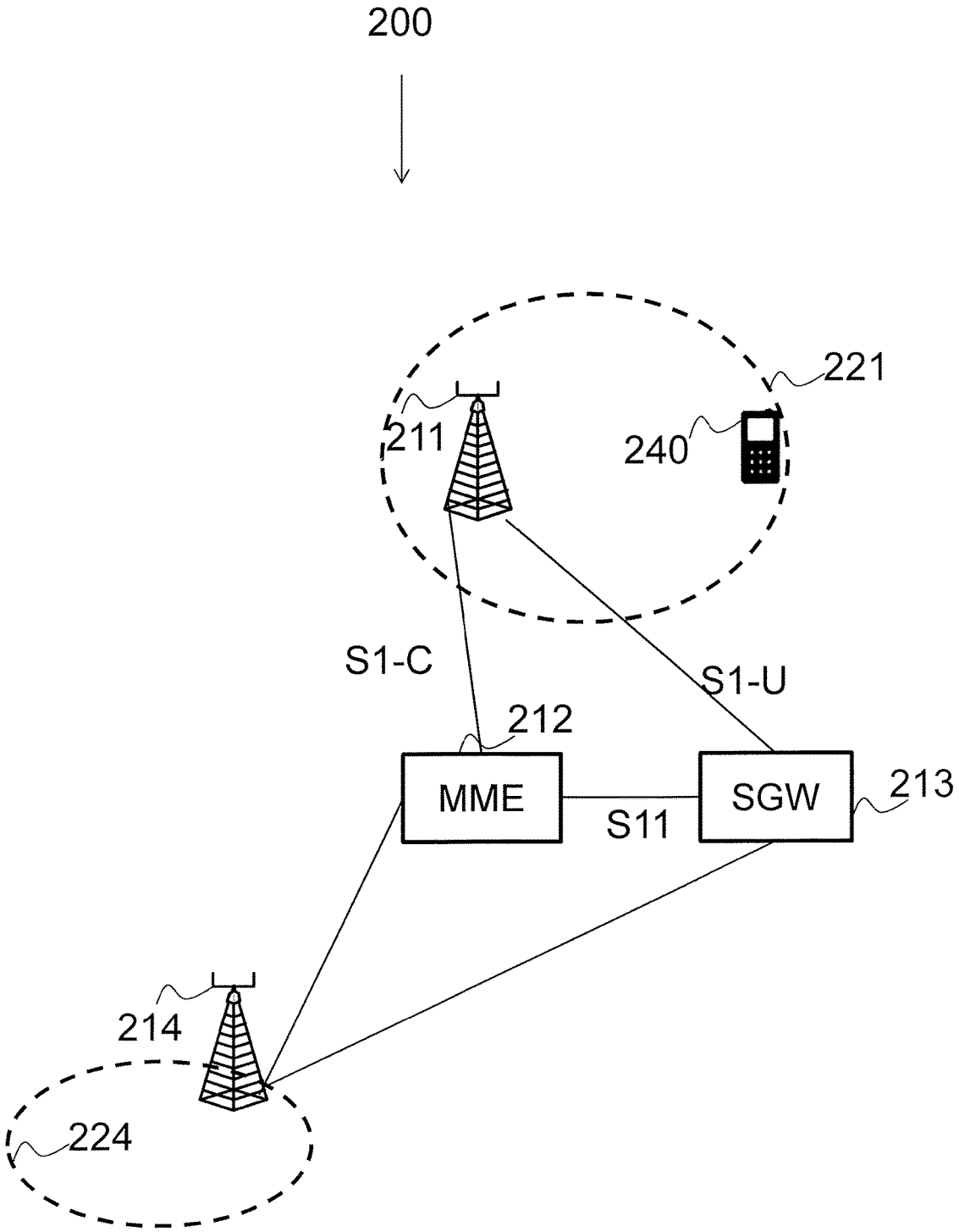
FIG. 2b is a further schematic block diagram illustrating a wireless communications network in which embodiments herein may be implemented.

In some embodiments, which may be described with reference to FIG. 2b, the wireless communications network 200 further comprises a fourth network node 214, e.g. another base station such as another eNB or an RNC in an UMTS system. The first network node 211 and the fourth network node 214 may operate and/or be comprised in a system 216 of network nodes depicted in FIG. 2b. Some of the embodiments herein may be implemented in the system 216 of network nodes. For example, a first part of these embodiments may be performed in the first network node 211 while a second part of these embodiments may be performed in the fourth network node 214.

The network node 211 serves a cell 221. Likewise, the fourth network node 214 may serve one or more cells. In FIG. 2b the fourth network node 214 serves a second cell 224.

A cell is a geographical area where radio coverage is provided by network node equipment such as Wi-Fi AP equipment, base station equipment at a base station site or at remote locations in Remote Radio Units (RRU). The network node 211 is an example of such network node equipment. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying cells uniquely in the whole of a wireless communication network is also broadcasted in the cells.

Throughout this description, the term "cell" is used to represent any area in which a network node provides radio coverage for wireless devices. Hence, this description is not limited to cellular networks and it may be valid and useful for any type of radio network in which various network nodes provide radio coverage.

Network nodes, such as base stations and Wi-Fi AP, communicate over the air or radio interface operating on radio frequencies with user equipment within range of the network nodes. The user equipment transmit data over the radio interface to network nodes, such base stations and Wi-Fi AP, in UL transmissions, and network nodes, such as Wi-Fi AP and base stations, transmit data over an air or radio interface to the user equipment in DL transmissions.

The first network node 211 communicates with wireless devices in the cell 221, such as a wireless device 240, also referred to as a UE or a user equipment. The wireless device 240 may be in different states or modes of operation. For example, when no data is sent from or to the wireless device 240 it may be in an idle state, in which the wireless device 240 does not have a connection 251, such as a Radio Resource Control (RRC) connection, in place with the first network node 211, such as an eNB. When data is transmitted to or from the wireless device 240 it may be in an active state with an active connection 251 between the wireless device 240 and the wireless communications network 200.

Figure 2C:
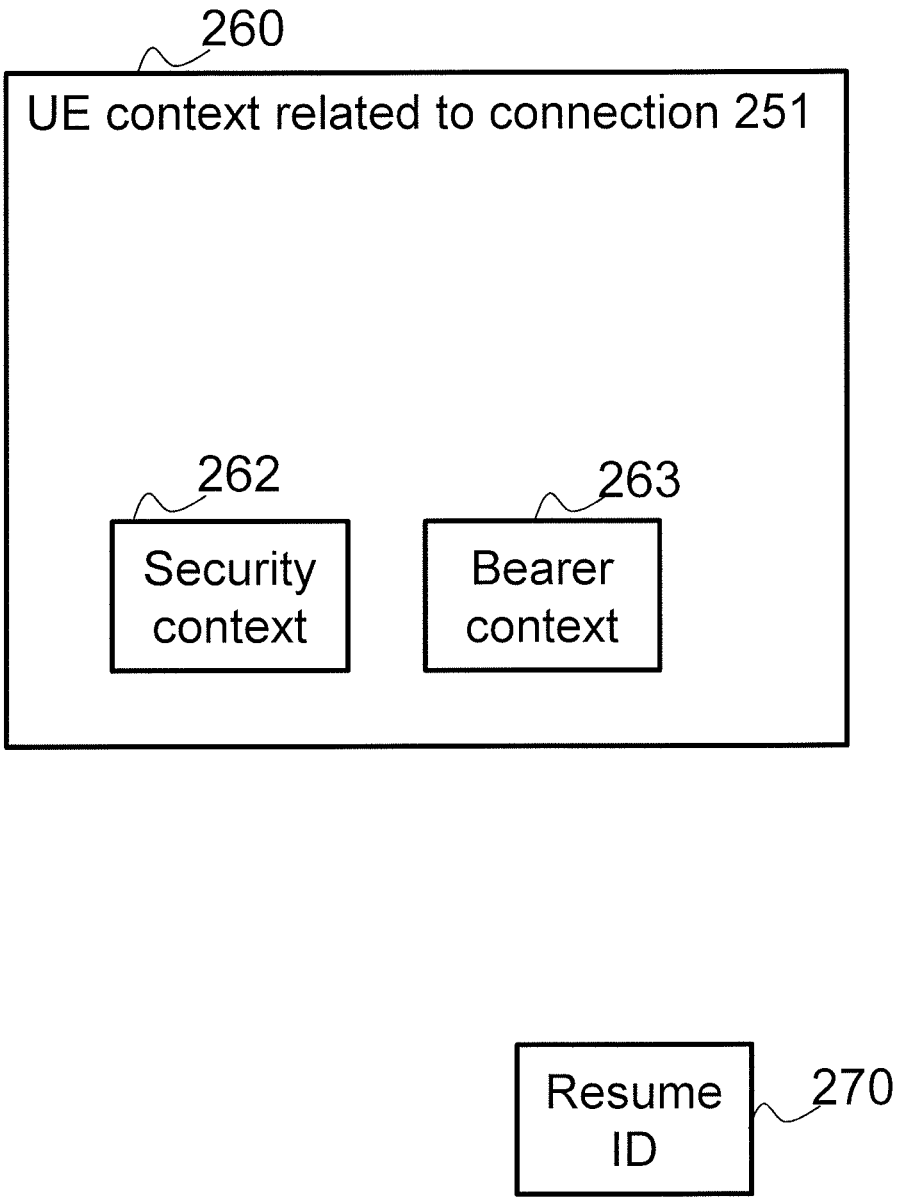
FIG. 2c is a schematic block diagram illustrating data related to a connection and an identifier of a wireless device used for handling the connection.

The connection 251 may be described by data 260 related to the connection 251. The data 260 related to the connection 251 is illustrated in FIG. 2c. The data 260 related to the connection 251 may be a context, such as a UE context. The UE context is related to the connection 251. As mentioned above, the UE context may comprise data related to the connection 251, such as data 262 related to security, such as keys, sequence number etc, and data 263 related to bearers, such as signaling and data bearers. The connection 251 between the wireless device 240 and the wireless communications network 200 comprises one or more bearers which are "virtual" connections between two endpoints in the wireless communications network 200. For example, in LTE signaling bearers are virtual connections between a UE and an MME, while data bearers are virtual connections between the UE and the SGW.

The wireless device 240 may be an MTC user equipment.

The wireless device 240 may further be e.g. a mobile terminal or a wireless terminal, a mobile phone, a computer such as e.g. a laptop, a Personal Digital Assistants (PDAs) or a tablet computer, sometimes referred to as a surf plate, with wireless capability, target device, device to device UE, MTC UE or UE capable of machine to machine communication, iPAD, mobile terminals, smart phone, Laptop Embedded Equipment (LEE), Laptop Mounted Equipment (LME), USB dongles etc. or any other radio network units capable to communicate over a radio link in a wireless communications network. Please note the term user equipment used in this document also covers other wireless devices such as Machine to machine (M2M) devices, even though they do not have any user.

Embodiments herein provide a more efficient procedure to move the wireless device 240, such as a UE, from a state corresponding to an idle state, e.g. RRC_IDLE state or mode, to a state where data may be transferred to and from the wireless communications network 200. This is achieved by reusing information from the previous session, i.e. from the previous connection.

The procedure is very efficient for wireless devices that make many accesses within the same cell or cell group. In this case, both air interface signaling as well as network internal signaling is reduced.

Embodiments herein will now be described briefly in general terms to give the reader an overview of embodiments herein.

Instead of releasing an established connection 251 between the wireless device 240 and the wireless communications network 200, the wireless device 240 and the connection 251 are 'suspended' in embodiments herein. Suspended means that any data 260 related to the established connection 251 between the wireless device 240 and the wireless communications network 200, including connection parameters, is saved in the wireless device 240 and in network nodes 211, 212, 213 connected to the wireless device 240, such as an eNodeB, an MME and an SGW.

The data 260 related to the connection 251 may comprise a UE context, for example a UE context related to security, bearers, T-IMSI and UE capabilities. More specifically, the UE context may comprise a security context and a context for the bearer, both related to the previous connection 251.

Further the wireless device 240 and the first network node 211 save the identifier 270 of the wireless device 240 for locating the data 260 related to the connection 251 later.

The wireless device 240 is in other aspects handled as if being in 'Idle mode', but when wanting to establish a connection towards the wireless communications network, the wireless device 240 may continue a previous session, that is 'resume the previous session' of the already established connection. I.e. in embodiments herein the wireless device 240 may be connected to the wireless communications network 200 using the same connection parameters for several sessions of the connection since these connection parameters are saved in the wireless device 240 and in the network nodes 211, 212, 213 during the above suspension of the connection 251.

Further, in embodiments herein, instead of establishing a new connection between the wireless device 240 and the wireless communications network 200 when there is new data to be transferred, the previous connection 251 is resumed, or continued, at a later time using the same security context and bearers.

The previous connection 251 is resumed by using the identifier 270 of the wireless device 240 for locating the data 260 related to the connection 251.

The 'Resume' of the previous connection 251 may be allowed within the cell 221 where the wireless device was 'suspended' or in the cell 221 in which information indicating that resume is possible is broadcasted.

Below, methods for suspending and resuming a connection between the wireless device 240 and the wireless communications network 200 will be illustrated in more detail by means of exemplary embodiments. The following embodiments will be described using LTE as an example, although the solution is not limited thereto, and the first network node 211 will be an LTE base station, i.e. an eNB. Further the second network node 212 will be an MME and the third network node 213 will be an SGW.

It will be assumed that network data is kept in the eNodeB, the MME and the SGW and that the S1-bearers are kept. Network data may for example be data related to the UE context and to the setup of bearers in the different network nodes. For example, when the first network node 211 is an eNB the network data may comprise MME resource used, SGW S1-U addresses, bearer configuration and Security context information. When the second network node 212 is an MME the network data may comprise UE and subscriber information, e.g. comprising bearer configuration, PDN connection used, SGW resource used and eNB resource used. When the third network node 213 is an SGW the network data may comprise PDN connection used, eNB S1-U addresses and Bearer configuration. Further, the S1 setup remains during the suspension of the connection. The radio bearers are remembered in the UE, eNB and MME and 'restarted' again at resume.

It should be noted that these embodiments are not mutually exclusive. Components from one embodiment may be tacitly assumed to be present in another embodiment and it will be obvious to a person skilled in the art how those components may be used in the other exemplary embodiments.

Actions that may be performed for handling the connection 251 between the wireless device 240 and the wireless communications network 200 according to embodiments herein will now be described in more detail with reference to FIG. 3, FIG. 4a, FIG. 4b, FIG. 4c and FIG. 4d. FIG. 3 and FIGS. 4a to 4d show the interaction between the different nodes that take part in embodiments herein.

Figure 3:
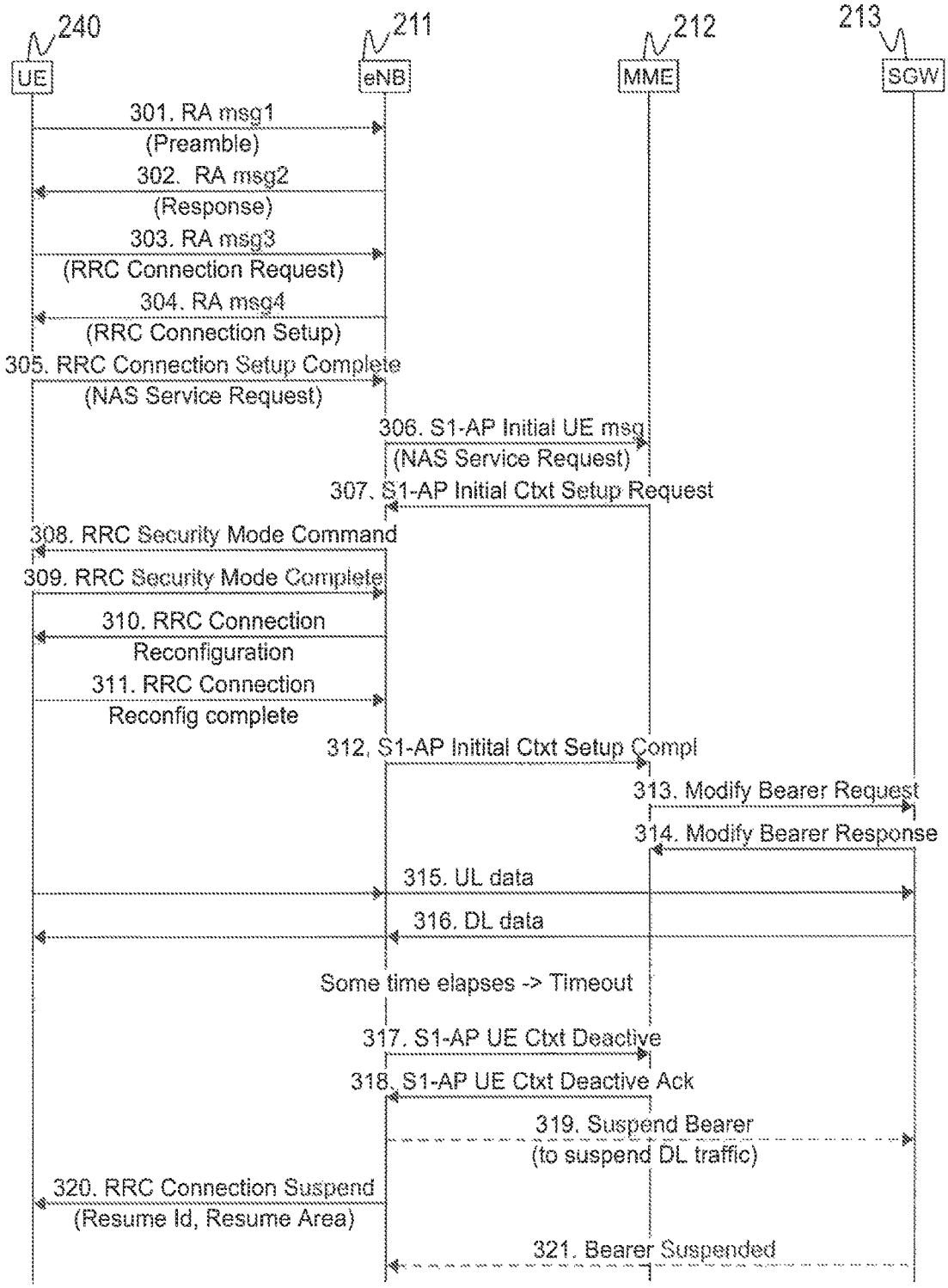
FIG. 3 is a signaling diagram illustrating embodiments of a method performed in a wireless communications network.

FIG. 3 is a signaling diagram illustrating a communication between the wireless device 240, the first network node 211, the second network node 212 and the third network node 213. FIG. 3 describes actions that may take place to resume the connection 251 between the wireless device 240, such as a UE, and the wireless communications network 200 according to embodiments herein. Further, FIG. 3 shows the interactions between the wireless device 240, the first network node 211, the second network node 212 and the third network node 213.

More specifically, FIG. 3 describes actions that may be performed to suspend the connection between the wireless device 240 and the wireless communications network 200.

Figure 4A:
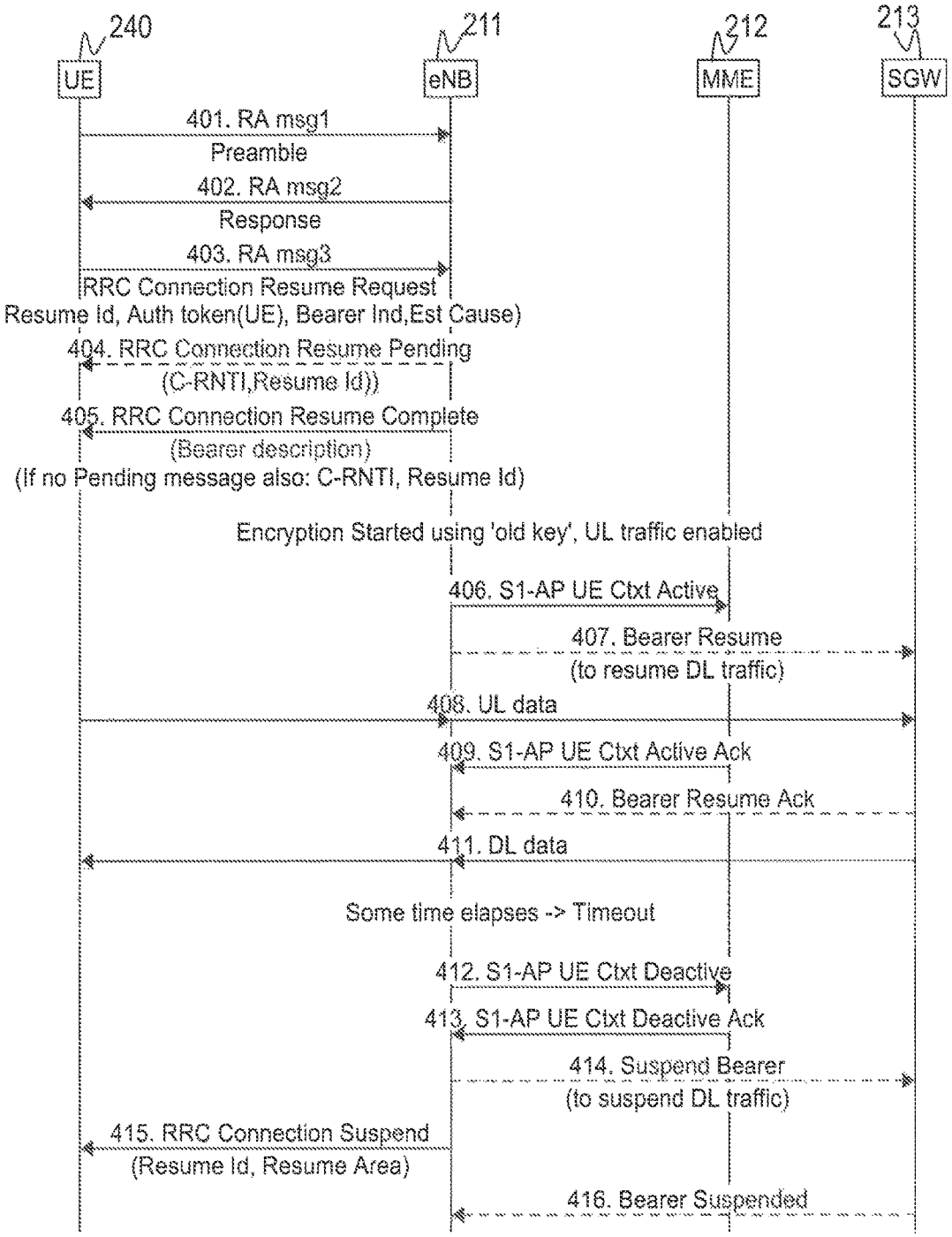
FIG. 4a is a signaling diagram illustrating further embodiments of a method performed in a wireless communications network.
Figure 4B:
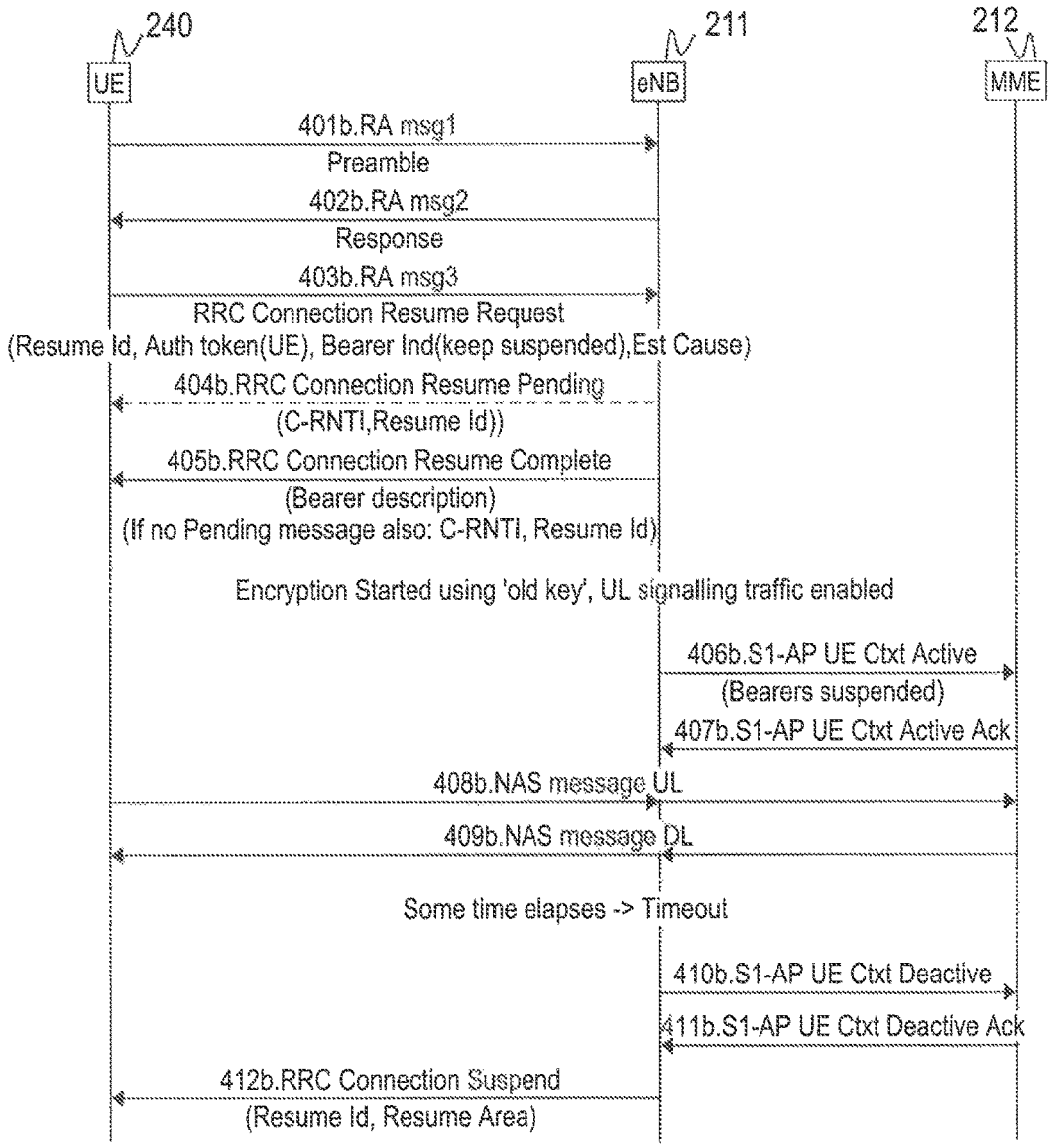
FIG. 4b is a signaling diagram illustrating further embodiments of a method performed in a wireless communications network.
Figure 4C:
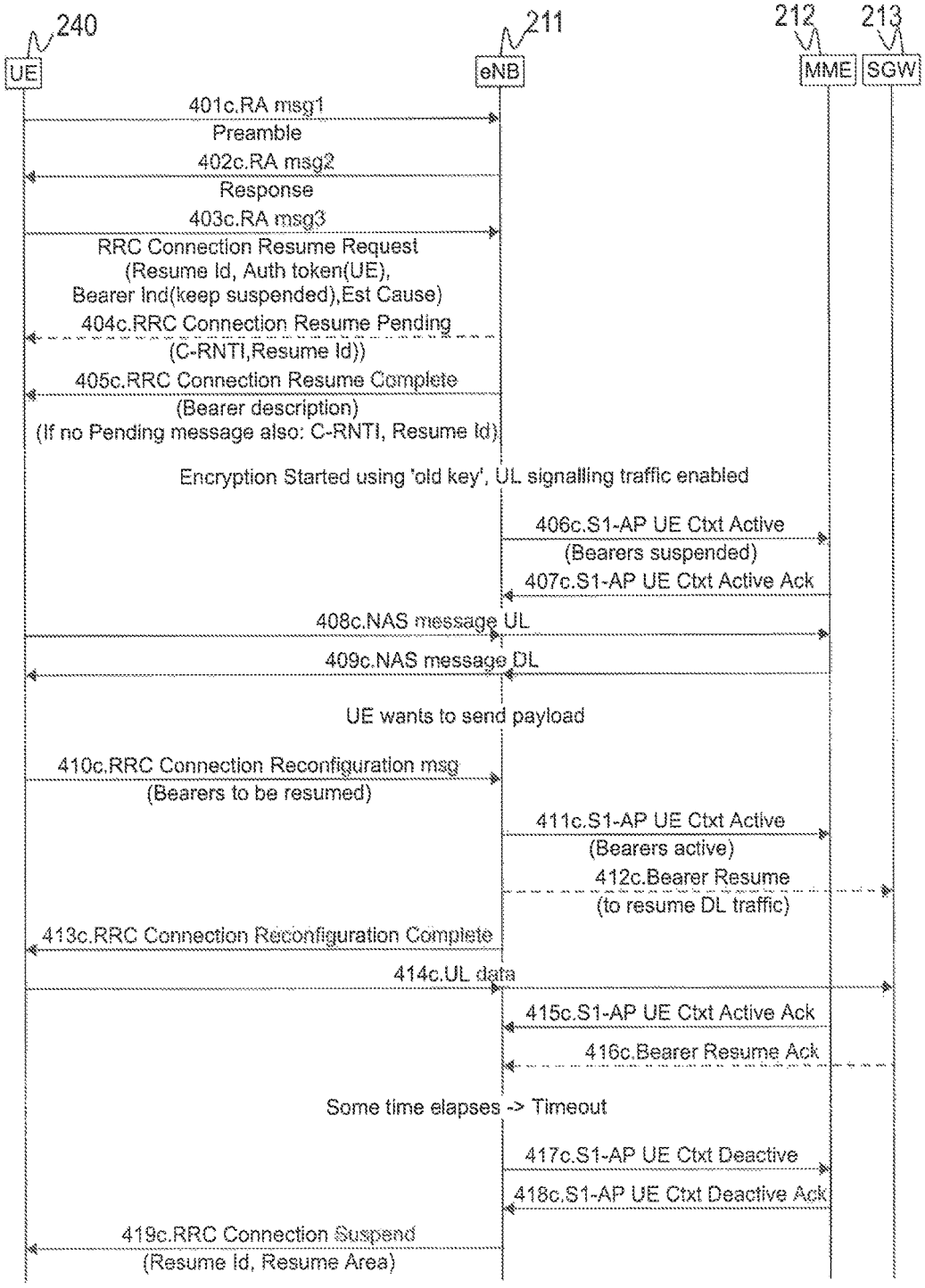
FIG. 4c is a signaling diagram illustrating further embodiments of a method performed in a wireless communications network.
Figure 4D:
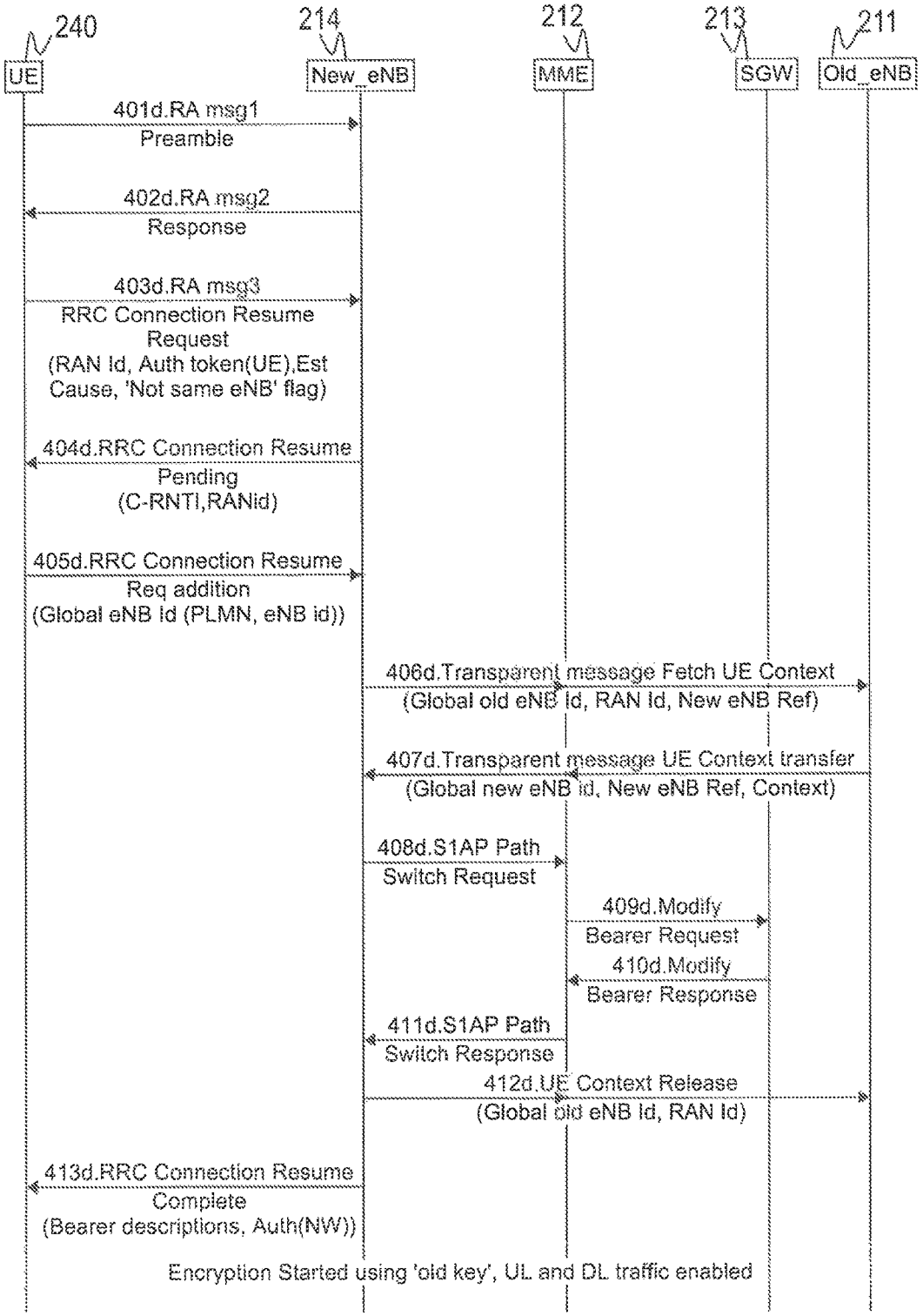
FIG. 4d is a signaling diagram illustrating further embodiments of a method performed in a wireless communications network.

FIG. 4a is a further signaling diagram that describes actions 401-410 that may take place to resume the connection 251 between the wireless device 240 and the wireless communications network 200 according to embodiments herein. More specifically, FIG. 4a describes further actions that may be performed to resume the connection 251 between the wireless device 240 and the wireless communications network 200 from its suspended state. FIGS. 4b, 4c and 4d disclose optional details.

First the connection between the wireless device 240 and the wireless communications network 200 is established in a conventional manner as described by actions 301-314 in FIG. 3. UL and DL data is transmitted in action 315 and 316. Thus the wireless device is in a connected mode, e.g. RRC Connected mode, as illustrated with the state/mode 500 in FIG. 5. The data bearers are set up. At some point in time the wireless device 240 has indicated that it supports the 'suspend/resume' handling. The support of suspend/resume may be implemented as a capability together with other UE capabilities. The capability may be sent to the wireless communications network 200 when setting up a connection, such as the connection 251, unless the wireless communications network 200 already has the capability.

After some time there is a timeout related to the connection. The timeout may be a result of a timer that expires in the first network node 211. The timer is related to the connection. However, instead of releasing the connection 251 it is 'suspended', which is described in actions 317 to 321, which will be described in more detail below. The first network node 211 may for example decide to suspend the connection 251 if the wireless device 240 supports suspension.

The concerned core network nodes, such as the second network node 212 and the third network node 213 are informed, for example by the first network node 211, that the wireless device 240 is in an 'RRC Suspended state'. The second network node 212 and the SGW may be informed either directly by the first network node 211 or via the other core network node. For example, the SGW may be informed by the second network node 212. In FIG. 3 the second network node 212 is informed about the wireless device 240 being 'suspended', for example with S1-AP UE Ctxt Deactive in action 317. The SGW is signaled with Suspend Bearer in action 319, to stop DL data traffic by the first network node 211.

The second network node 212 may acknowledge the information from the first network node 211 in action 318 and the third network node 213 may acknowledge the information from the first network node 211 in action 321.

The wireless device 240 receives 320 a command, e.g. from the first network node 211, to transition into a suspended idle mode. The wireless device 240 will then behave as in 'idle mode', but caches a context related to the last connection, for example data related to security, such as keys, sequence number etc, and data related to bearers, such as signaling and data bearers.

The bearers, such as signaling and data bearers, related to the previous connection are kept, i.e. these bearers are maintained for the time being by the network on behalf of the wireless device 240.

The wireless device 240 is further given a unique identity or identifier 270 of the wireless device 240, e.g. a resume identifier, to use later when the wireless device 240 wants to resume the connection. The identifier 270 of the wireless device 240, such as the resume identifier, is used to locate the data 260 related to the connection 251, such as the UE context, within the first network node 211. The C-RNTI (MAC id) may be used as the identifier 270. The identifier 270, such as the resume identifier, is unique within an area, which comprises one or more cells, such as the cell 221. If the area is more than one cell, the cells may broadcast information to allow the wireless device 240 to decide if resumption is allowed or not in the cells.

Also other information may be broadcasted to allow the wireless device 240 to decide if resumption is allowed in the cells, e.g. after how long time resumption is allowed in the cells, validity of the resume identifier etc.

The wireless device 240 is now in a suspended state. The suspended state corresponds to an idle state in which the wireless device 240 stores the data 260 related to the connection 251 and the identifier 270 of the wireless device 240 for resuming the connection 251 later.

When the wireless device 240 wants to resume its connection 251 for some reason, e.g. due to paging of the wireless device 240, wanting to send data, etc, it takes contact with the network, i.e. with the first network node 211. If the wireless device 240 supports a resumption of the suspended connection 251 it may check whether or not the identifier 270 of the wireless device 240 is valid.

The initial contact may be made by transmitting 401 a first random access message RA msg 1 comprising a preamble. The first network node 211 may respond 402 with a second random access message msg2. Then the wireless device 240 initiates the resumption by transmitting 403a either a new message RA msg3, called RRC Connection Resume Request in embodiments herein, or an updated existing message, e.g. RRC Re-establish Request. The message comprises data which enable the first network node 211 to uniquely identify the previously suspended wireless device 240. Such data may for example be the identifier 270 of the wireless device 240 which is related to the connection.

The RA msg 3 message may also comprise a kind of 'authentication token' to reduce the risk of 'Denial of service' attacks and also fraud.

If the first network node 211 finds that the identifier 270 of the wireless device 240, such as the resume identifier, sent to it from the wireless device 240 in order to resume the connection 251, is known and the data 260 related to the connection 251, e.g. the related UE context, is ok, e.g. the stored UE context has not been deleted or become too old, then the first network node 211 responds to the wireless device 240 with a response message in action 405. The response message may for example be a control message such as RRC Connection Resume Pending or RRC Connection Resume Complete. The response message comprises the identifier 270 of the wireless device 240, such as the resume identifier, to make sure both the wireless device 240 and the first network node 211 communicates about the same connection. This may be needed e.g. for performing contention resolution, and informs the wireless device 240 that the resumption is complete.

The response message may further indicate to the wireless device 240 that the first network node 211 recognises the wireless device 240 on RRC level, enable contention resolution and give the wireless device 240 a unique scheduling identifier, e.g. C-RNTI in LTE.

To allow for different response times for contention resolution—the objective is normally to keep the response time short—and for final completion of the resumption the response message may be split into two messages or kept as one message. That is, as illustrated in FIG. 4a, a first response message, RRC Connection Pending, is sent in action 404 to complete the contention resolution by giving a unique scheduling identifier within a certain short time. Then, afterwards the first network node 211 finally accepts the resumption with the later RRC Connection Complete message in action 405. The first network node 211 may also chose to only send RRC Connection Complete and include all data needed for the contention resolution and the final completion of the resumption of the connection.

When this has been performed the wireless device 240 may be scheduled by the first network node 211 to send uplink data on the resumed bearers. The action of scheduling is not shown in FIG. 4a.

The first network node 211 then informs 406 the second network node 212 that the data 260 related to the connection 251, e.g. the UE context, has become active, that is, paging is not needed anymore. The first network node 211 further informs 407 the third network node 213 that DL packets may be sent on the DL data bearers. The actual signaling may be made in many ways. In FIG. 4a the first network node 211 signals the second network node 212 with an S1-AP UE CTxt Active and sends in-band instructions, such as Bearer resume to the third network node 213. It is also possible that the second network node 212 informs the third network node 213 instead or vice versa.

The wireless device 240 may now send uplink data to the third network node 213 in action 408.

The second network node 212 responds with an S1-AP UE Ctxt Active Ack to the first network node 211 in action 409. The third network node 213 responds with a Bearer Resume Ack in action 410.

When the third network node 213 has been informed that the data 260 related to the connection 251, e.g. the UE context, has become active, it may forward 411 DL data or messages to the first network node 211 to be transferred to the wireless device 240.

The wireless device 240 is now fully resumed and in the same state in all nodes as if a normal service establishment had been done.

When a network node decides that the wireless device 240 shall not be kept in RRC_CONNECTED anymore, this may be either initiated by the first network node 211 or initiated by the second network node 212.

FIG. 4a illustrates the case where it is the first network node 211 that initiates to stop the connected mode. The first network node 211 then sends 412 a request to the second network node 212 to deactivate the data 260 related to the connection 251, e.g. the UE context. In other words, the first network node 211 requests that the second network node 212 pages the wireless device 240 in case of downlink signaling or data is to be sent to the wireless device 240. The second network node 212 answers 413 if this was accepted, e.g. if the second network node 212 supports suspended mode functionality and suspended mode is allowed to use. In the case of acceptance, the first network node 211 will inform 414 the third network node 213 to suspend DL packet transfer on DL data bearers and to inform the second network node 212 to page the wireless device 240 in case of a downlink control message or a payload, i.e. data traffic, is to be transferred to the wireless device 240. The first network node 211 will also command 415 the wireless device 240 to transition into suspended idle mode. The command comprises the identifier 270 of the wireless device 240, e.g. a resume id, to be used at a possible later resumption of the connection.

In the case that it is the second network node 212 that initiates to stop the connected mode, the second network node 212 may send a UE Context Release Command to the first network node 211. The command may comprise an optional indication that the connection 251 may be suspended as an alternative to released. If the first network node 211 decides to suspend the connection instead of releasing the connection, it should indicate this in a response message to the second network node 212. The first network node 211 will then continue to indicate to the third network node 213 to suspend DL packet transfer on DL bearers. The first network node 211 will also indicate to the second network node 212 to page the wireless device 240. The first network node 211 will also command the wireless device 240 to be suspended, i.e. transition into suspended idle mode. The command comprises the identifier 270 of the wireless device 240, e.g. the resume identifier, to be used at a possible later resumption.

If a DL packet is sent from the third network node 213 to the first network node 211 on a bearer that the first network node 211 considers suspended, the first network node 211 may send back an error message indicating this. This mechanism will make it possible to not send an acknowledgement on the suspend message from the first network node 211 to the third network node 213 in action 321, 416. That is, the acknowledgement of the Suspend Bearer message, i.e. the Bearer Suspended message, in FIG. 3 and FIG. 4a may in that case be removed.

Also the acknowledge message in action 410 for the Bearer Resume message in action 407 from the first network node 211 to the third network node 213 may be omitted if the first network node 211 repeatedly re-sends the 'Bearer Resume' message until a DL message has been detected.

FIG. 4b describes how the data bearers may be kept suspended also after resumption of the connection 251. In this case, the data bearers may be kept suspended in the core network, i.e. in the second and third network nodes 212, 213. The data bearers are still known to the wireless device 240, the first network node 211 and to the core network nodes, i.e. the second network node 212 and the third network node 213, but may not be used. Only default signaling bearers may be used.

Initially, FIG. 4b corresponds to FIG. 4a, i.e. actions 401b to 406b correspond to actions 401a to 406a. Action 407c corresponds to action 409a. However, the RA msg 3 message in action 403b may also comprise an indication if the data bearers from the previous connection 251 shall be used or not. Correspondingly, the S1-AP UE Ctxt Active message in action 406b comprises an indication to the second network node 212 that the bearers for the connection 251 shall be kept suspended.

This allows further advantages for 'signaling only traffic', e.g. Non-Access Stratum (NAS) traffic as exemplified in actions 408b NAS message UL and 409b NAS message DL. That is, if only control signaling is needed, e.g. network internal signaling or SMS, then no data bearers are needed.

The connection 251 may be suspended again after the NAS traffic has ended as exemplified with actions 410b-412b which correspond to actions 412a, 413a and 415a.

The advantages of keeping the data bearers suspended may for example be less processing in the third network node 213 and the first network node 211. Actions corresponding to actions 407a and 410a in FIG. 4a are not performed in FIG. 4c.

If the wireless device 240 or the core network nodes 212, 213 want to send data, the data bearers may be 'resumed' from the first network node 211 afterwards as described in FIG. 4c. That is, the bearers may be resumed after the connection 251 has been resumed with suspended bearers as described in FIG. 4b. Actions 401c to 409c correspond to actions 401b to 409b.

Towards the wireless device 240 either a new or existing message, such as an updated RRC Re-configuration Request in action 410c, may be reused for later resumption of the data bearers. That is, the wireless device 240 may request the bearers related to the connection 251 to be resumed by sending the updated RRC Re-configuration Request in action 410c to the first network node 211. The first network node 211 then sends an S1-AP UE Ctxt Active message to the second network node 212 in action 411c. The S1-AP UE Ctxt Active message indicates that the bearers shall be active. The first network node 211 sends an RRC Connection Reconfiguration Complete message to the wireless device 240 in action 413c. The wireless device 240 may now send uplink data to the third network node 213 in action 414c.

Further, the second network node 212 responds to the first network node 211 with a S1-AP UE Ctxt Active Ack message in action 415c, as was also the case for action 409 and action 407b.

Towards the third network node 213 the same signaling as used for the initial resumption of the connection 251 may be used for this later resumption of the data bearers, i.e. action 412c corresponds to action 407 Bearer resume while action 416c corresponds to action 410 Bearer Resume Ack.

Actions 417c-419c suspends the connection 251 again and these actions correspond to actions 410b-412b in FIG. 4b and actions 412-413 and 415 in FIG. 4a.

When the wireless device 240 is paged, the normal case is to always resume the data bearers. An alternative to this is if the second network node 212 indicates in a paging message if data bearers are needed to be resumed or not. The wireless device 240 may then indicate the need for data bearers to be resumed or not in the following RRC Connection Resume Request.

The first network node 211 may provide additional information to the wireless device 240 in its cells, such as the cell 221. The first network node 211 may indicate if resume is allowed in the cell 221. The first network node 211 may indicate which 'Resume Area' the cell 221 belongs to.

The second network node 212 may provide the first network node 211 with information if 'suspend is allowed' during the service establishment and handover if second network node 212 is changed.

It may also be possible to forward the information related to the connection 251 and stored in one network node between the nodes, e.g. over X2 or S1 interfaces to support the resume procedure over a larger geographical area. For example, the wireless device 240 may be suspended by the first network node 211 which stores the data 260 related to the connection 251. Then the wireless device 240 may resume the connection 251 in a cell served by another network node, e.g. in the second cell 224 served by the fourth network node 214. The first network node 211 may e.g. forward the data 260 related to the connection 251 to the fourth network node 214.

In some embodiments the data 260 is stored in the second network node 212 or found via the second network node 212. In order for the wireless device 240 to be able to initiate locating of the data 260 which is stored in the second network node 212 or in the fourth network node 214 the data 260 may comprise information about the identity of the second network node 212. For example, the wireless device 240 may store information about the identity of which MME to contact.

FIG. 4d describes some optional actions that may be performed in case the wireless device 240 is suspended by one network node and resumed by another network node. Actions 401d-405d are similar to actions 401-405.

In action 406d the fourth network node 214 signals the second network node 212 to obtain the data 260. If the data 260 is obtained from another network node, such as the first network node 211, a path switch is made.

The fourth network node 214 sends 408d a path switch to the second network node 212 which will signal 409 the third network node 213 to change user plane address, e.g. eNB user plane address, from the first network node 211 to the fourth network node 214. Then these signals are returned back in action 410d and action 411d. I.e. the third network node 213 responds to the second network node 212 in action 410d and the second network node 212 responds to the fourth network node 214 in action 411d. The first network node 211 releases the data 260, e.g. after receiving 412d a UE Context Release message from the fourth network node 214. Then the fourth network node 214 sends 413d resume complete to the wireless device 240.

In FIG. 4d the data 260 is fetched in another network node via the second network node 212. However, the data 260 may also be obtained directly from the other network node.

There is no need for extra mobility signaling for the wireless device 240, such as a UE, in suspended idle mode. One or a combination of the following mechanisms may be used to delete the data 260 related to the connection 251, e.g. the UE context, and related resources in the network nodes, such as the first network node 211, the second network node 212 and the third network node 213. An example of related resources are the reserved SGW resources.

If the wireless device 240 makes a service request and the second network node 212 detects that this wireless device 240 is 'suspended', the second network node 212 may inform both the first network node 211 and the third network node 213 to release its resources and contexts related to the suspended data 260 related to the connection 251, e.g. the suspended UE context.

If the second network node 212, the first network node 211 or the third network node 213 have deleted, wants to or needs to delete a stored data 260 related to the connection 251, such as the UE context, then it informs the other network nodes. This may also be done indirectly, e.g. the first network node 211 may only inform the second network node 212 since according to normal legacy logic the second network node 212 releases the third network node 213 resources.

A trigger for such actions may be:

Resource shortage such as memory, identifiers etc;

Timing, that is the data 260 related to the connection 251, such as the UE context, is only kept in idle mode for a certain maximum time;

Maintenance actions, for example restarts or manual intervention.

Embodiments of a method for handling the connection 251 will now be described from the viewpoint of the different nodes that participate in embodiments herein. The embodiments will be described in relation to FIG. 5, FIG. 6, FIG. 7, FIG. 8, FIG. 9, FIG. 9a, FIG. 10 and FIG. 10a. That is, the followings are embodiments related to the first network node 211, the second network node 212, the third network node 213 and the wireless device 240.

Embodiments will first be described from the viewpoint of the first network node 211. The first network node 211 embodiments relate to FIGS. 5, 6, 7 and 7a.

In some embodiments the fourth network node 214 may take the place of the first network node 211 for some of the actions.

Figure 5:
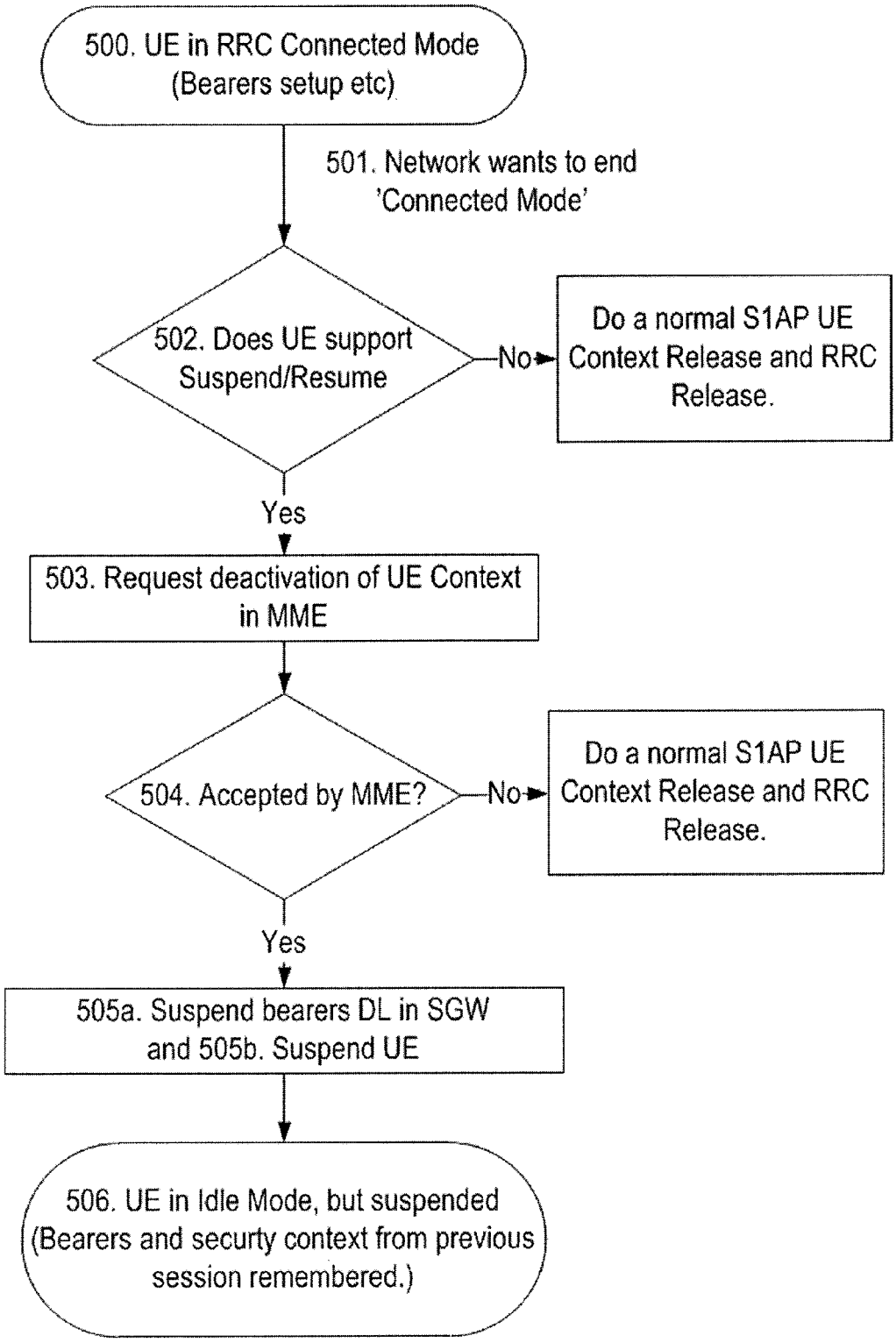
FIG. 5 is a flowchart illustrating embodiments of a method performed by a first network node.
Figure 6:
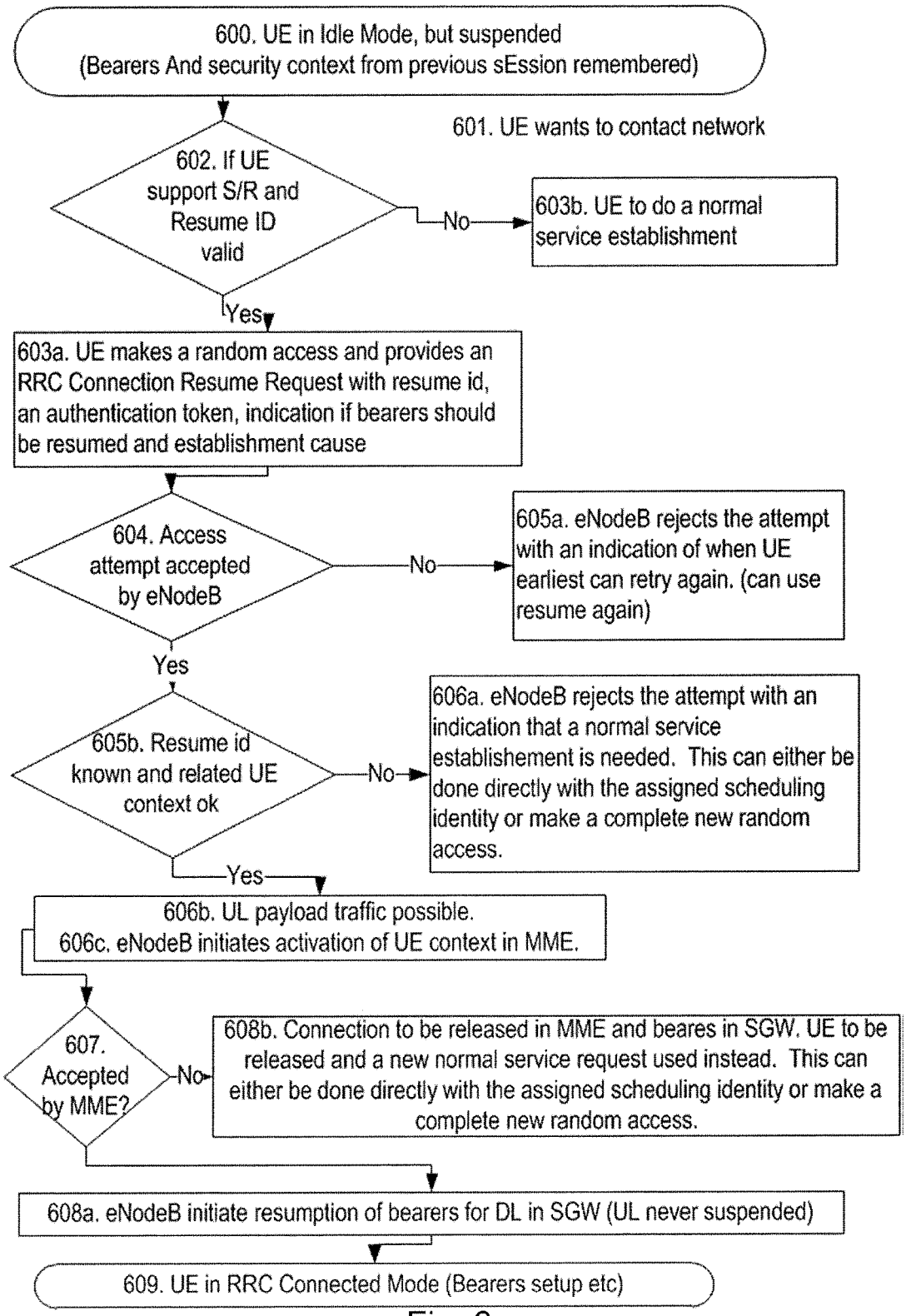
FIG. 6 is a flowchart illustrating embodiments of a method performed in a wireless communications network.

FIGS. 5 and 6 are flow charts that complement FIGS. 3 and 4a-4d and that describe actions that may take place to resume the connection 251 between the wireless device 240 and the wireless communications network 200 according to embodiments herein. More specifically, FIG. 5 complements FIG. 3 and describes actions to suspend the connection 251 between the wireless device 240 and the wireless communications network 200, while FIG. 6 complements FIG. 4a and describes actions to resume the connection 251 from the suspended state.

FIG. 5 further outlines how the wireless device 240 in 'connected mode' is moved to 'idle mode', while keeping the data 260 related the connection 251, e.g. the UE context, in the wireless device 240 and in the network nodes so that the previous connection 251 may be 'resumed' later. In other words, so that it is possible to continue with the same connection data, e.g. security context, keys, bearer setup etc.

Actions 501, 502, 503, 504, 505a and 505b related to FIG. 5 are performed by the first network node 211. FIG. 5 also describes two modes or states of operation of the wireless device 240. These states are referred to as state 500, in which the wireless device 240 is in RRC Connected Mode, and state 506 in which the wireless device 240 is in a suspended mode, also referred to in FIG. 5 as in Idle Mode, but suspended.

FIG. 6 outlines how the previously suspended wireless device 240, may resume the previous connection 251. Parts of the method are performed by the wireless device 240 while other parts are performed by the first network node 211. Actions 601-603 are performed by the first network node 211. Actions 603a-608b are performed by the first network node 211.

FIG. 6 also describes two modes or states of operation of the wireless device 240. These states are referred to as state 600, in which the wireless device 240 is in a suspended mode, also referred to in FIG. 6 as in Idle Mode, but suspended. In state 609 the wireless device 240 has re-entered in RRC Connected Mode.

Figure 7:
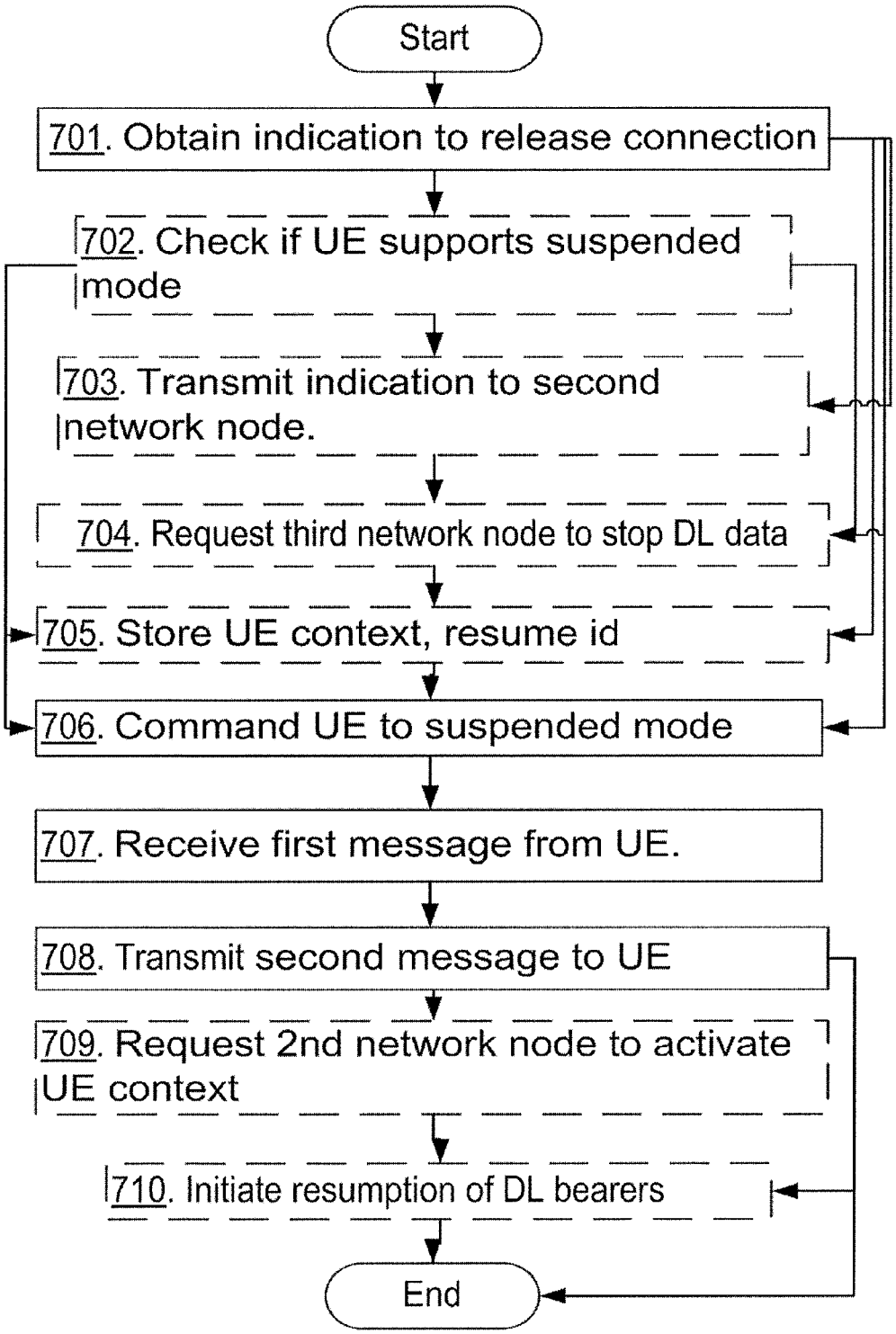
FIG. 7 is a flowchart illustrating embodiments of a method performed by a first network node.
Figure 7A:
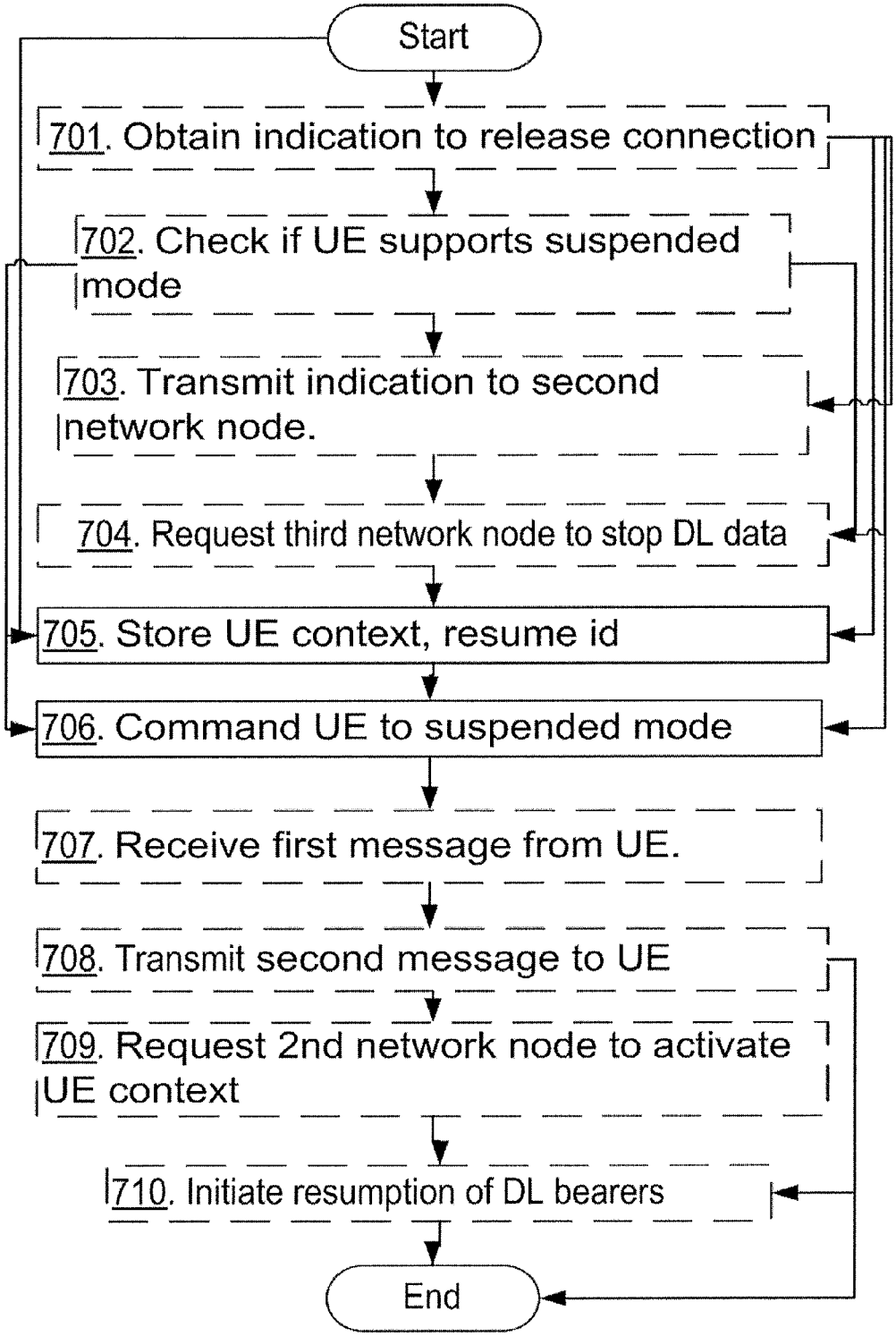

FIGS. 7 and 7a are flowcharts that describe actions of a method for suspending and resuming the connection 251 according to embodiments herein. FIGS. 7 and 7a describe the same actions but in FIG. 7a an arrow has been added from start to action 705 compared to FIG. 7. Actions 701-710 are also related to FIGS. 5 and 6 and are performed by the first network node 211. FIGS. 5, 6 and 7 complement each other.

Actions 501, 701

The first network node 211 may obtain an indication that the connection 251 between the wireless device 240 and the wireless communications network 200 has not been used to transfer data for a while, e.g. that the wireless device 240 has been inactive for a while. In other words the obtained indication is or may be interpreted as an indication that the connection 251 between the wireless device 240 and the wireless communications network 200 is to be suspended or released. The indication may be provided as a timeout of the connection 251 between the wireless device 240 and the wireless communications network 200. The time out may be provided by a timer module 1110 in the first network node 211. The timer module 1110 may be implemented by a processor 1180 in the first network node 211.

Actions 502, 702

As a result of the obtained indication that the connection 251 between the wireless device 240 and the wireless communications network 200 is to be suspended or released the first network node may determine whether or not to suspend or release the connection 251.

In some embodiments the first network node 211 checks that the wireless device 240 supports resumption of the connection 251 before it tries to suspend the connection 251. This action may be performed by means such as a checking module 1120 in the first network node 211. The checking module 1120 may be implemented by the processor 1180 in the first network node 211.

Actions 503, 703

Other network nodes, e.g. core network nodes such as the second network node 212 and the third network node 213 may need to be informed about the suspension. For example, the network may not send downlink data to the wireless device 240 during the suspension of the connection 251 without paging the wireless device 240 first.

In some embodiments the first network node 211 transmits an indication to the second network node 212, which is responsible for paging of the wireless device 240, that the connection 251 between the wireless device 240 and wireless communications network 200 is to be released.

The message to the second network node 212 may comprise a request to deactivate the data 260 related to the connection 251, e.g. the UE context, in the second network node 212. The request to deactivate the data 260 related to the connection 251 may further comprises an indication that the second network node 212 shall page the wireless device 240 in case of a downlink control message or a payload is to be transferred to the wireless device 240. The message to the second network node 212 may further comprise a request to store the UE context, the identifier 270 of the wireless device 240, e.g. the resume identifier of the wireless device 240 and a description of the bearer.

In some embodiments the identifier 270 of the wireless device 240 is optionally included in the message to the second network node 212 in order to find the data 260 related to the connection 251 in case of larger resume area.

The request may be accepted or acknowledged or it may be rejected by the second network node 212. This action may be performed by means such as a transmitting module 1130 in the network node 211. The transmitting module 1130 may be implemented by a transmitter in the first network node 211.

This action is related to action 901 below.

Action 504

The first network node 211 may check whether the second network node 212 accepted the request in actions 503, 703.

Actions 505a, 704

If the second network node 212 accepted the request in actions 503, 703 then the first network node 211 may request the third network node 213 to stop DL data traffic to the wireless device 240, since the wireless device 240 is unable to receive DL data without being paged first during the suspension.

This action may be performed by means such as a requesting module 1140 in the first network node 211. The requesting module 1140 may be implemented by the processor 1180 in the first network node 211.

These actions are related to actions 1000 and 1001 below.

Action 705

In order for the first network node 211 to be able to resume the connection 251 later the first network node 211 stores data 260 related to the connection 251, and further stores the identifier 270 of the wireless device 240 for locating the stored data 260 related to the connection 251 later.

The data 260 related to the connection 251 may be a UE context related to the connection 251 and the wireless device 240.

In other words the first network node 211 stores the UE context and the resume identifier of the wireless device 240 and related to the last connection 251.

This action may be performed by means such as a memory 1190 in the first network node 211.

Actions 505b, 706

The first network node 211 provides the wireless device 240 with a command to transition from a connected mode into a suspended mode. In the suspended mode the connection 251 is suspended and the wireless device 240 stores the data 260 related to the connection 251. The wireless device 240 further stores the identifier 270 of the wireless device 240 for locating the data 260 related to the connection 251 later.

In other words, the command to transition from the connected mode into the suspended mode further comprises a command to suspended the connection 251 and to store the data 260 related to the connection 251, and to store the identifier 270 of the wireless device 240 for locating the stored data 260 related to the connection 251 later.

This action may be performed when the first network node 211 has obtained an indication that the connection 251 between the wireless device 240 and the wireless communications network 200 is to be suspended or released. In some embodiments this action is performed if the request to deactivate the UE context has been accepted by the second network node 212.

These actions may be performed by means such as a commanding module 1150 in the first network node 211. The commanding module 1150 may be implemented by the processor 1180 in the first network node 211.

These actions are related to action 801 below.

Actions 603a, 707

The first network node 211 receives a message from the wireless device 240. The received message indicates a request from the wireless device 240 to resume the connection. In other words, the received message indicates that the wireless device 240 wants to establish a new connection 251.

The received message comprises the identifier 270, such as the resume identifier, of the wireless device 240 for locating the stored data 260. The identifier 270 enables the first network node 211 to locate the data 260 related to the connection.

Thus in some embodiments as part of the receiving action the first network node 211 locates the stored data 260 related to the connection based on the received identifier 270 of the wireless device 240.

In some embodiments the received message from the wireless device 240 comprises an indication of whether or not to resume data bearers. This was explained above in relation to FIGS. 4-4c. If the data bearers are not resumed at once the first network node 211 and the third network node 213 will perform less processing related to the connection 251 which will enhance the performance of these nodes and of the wireless communications network 200.

The received message may be received with RRC signaling.

This action may be performed by means such as a receiving module 1160 in the first network node 211. The receiving module 1160 may be implemented by a receiver in the first network node 211.

In some embodiments this action may be performed by the fourth network node 214.

These actions are related to action 803 below.

Action 604

The first network node 211 may check whether or not it shall accept the access attempt by the wireless device 240. In some embodiments this action may be performed by the fourth network node 214.

Action 605a

If the first network node 211 rejects the random access attempt from the wireless device 240 it may reject the attempt with an indication of when the wireless device 240 earliest may retry to access the network again. The wireless device 240 may try to resume the connection 251 again.

In some embodiments this action may be performed by the fourth network node 214.

Action 605b

If the first network node 211 accepts the random access attempt from the wireless device 240 it may further check whether or not the identifier 270 of the wireless device 240 is known and/or valid.

If the identifier 270 is valid then the first network node 211 may check whether or not the related data 260 related to the connection 251 is ok. For example, the 'authentication token' provided by the wireless device 240 may be used to validate that it is the correct wireless device that is trying to resume the connection 251. The authentication token may be a value derived from a secret key, e.g. by an algorithm, known by the wireless device 240 and by the wireless communications network 200. This is especially important if the connection 251 was unencrypted.

In some embodiments this action may be performed by the fourth network node 214.

Action 606a

If the identifier 270 of the wireless device 240 or the data 260 related to the connection 251 are not valid any more, then the first network node 211 may reject the attempt with an indication that a normal service establishment is needed. This may either be done directly with the assigned scheduling identity or the wireless device 240 may need to make a complete new random access.

In some embodiments this action may be performed by the fourth network node 214.

Actions 606b, 708

The first network node 211 resumes the connection 251 by transmitting a message to the wireless device 240 in response to the message received in action 707 above. The transmitted message comprises the identifier 270 of the wireless device 240, and further comprises an indication that a resumption of the connection 251 is complete. The suspended connection 251 between the wireless device 240 and the wireless communications network 200 is resumed using the data 260 related to the suspended connection 251. UL payload traffic is now possible.

In other words, the first network node 211 transmits a control message to the wireless device 240 in response to the received message from the wireless device 240. The control message comprises the resume identifier of the wireless device 240 and an indication that a resumption of the connection 251 is complete, whereby the connection 251 between the wireless device 240 and the wireless communications network 200 is resumed using the UE context.

The control message may further comprise a description of the bearer related to the connection 251. The bearer may be any one or more out of a signaling bearer and a data bearer. This action may be performed by the transmitting module 1130 in the first network node 211.

The transmitted message may be transmitted with RRC signaling.

In some embodiments this action may be performed by the fourth network node 214.

These actions are related to action 804 below.

Actions 606c, 709

The first network node 211 may request the second network node 212 to activate the data 260 related to the connection 251, such as the UE context. In this way the first network node 211 may initiate activation of the data 260 related to the connection 251 in the second network node 212.

The request may be seen as an indication that the wireless device 240 wants to resume or has resumed the connection 251 again.

This action may be performed by the requesting module 1140 in the first network node 211.

In some embodiments this action may be performed by the fourth network node 214.

These actions are related to action 904 below.

Action 607

In some embodiments the first network node 211 checks whether or not the second network node 212 accepts the request to activate the data 260 related to the connection 251.

In some embodiments this action may be performed by the fourth network node 214.

Actions 608a, 710

If the second network node 212 accepts the request to activate the UE context the first network node 211 may initiate resumption of bearers for DL in the third network node 213. In other words, the first network node 211 may transmit an indication that the wireless device 240 wants to establish or has established the connection again. For example, if the RRC Resume complete is sent to the wireless device 240 before the second network node 212 answers, then the indication indicates that the connection has been established. If the first network node 211 waits for the second network node 212 to answer, then the indication indicates that the wireless device 240 wants to establish the connection.

If the second network node 212 does not accept the request to activate the UE context the connection 251 is to be released in the second network node 212 and bearers are to be released in the third network node 213. Further, the wireless device 240 is to be released and a new normal service request is to be used instead. This may either be done directly with the assigned scheduling identity or the wireless device 240 may need to make a complete new random access.

This action may be performed by means such as an initiating module 1170 in the network node 211. The initiating module 1170 may be implemented by the processor 1180 in the first network node 211.

In some embodiments this action may be performed by the fourth network node 214.

These actions are related to action 1003 below.

Action 608b

If the second network node 212 rejects the request to activate the UE context the connection is to be released in the second network node 212 and bearers are to be released in the third network node 213. The wireless device 240 is to be released and a new normal service request used instead. This may either be done directly with the assigned scheduling identity or the wireless device 240 may make a completely new random access.

In some embodiments this action may be performed by the fourth network node 214.

Embodiments will now be described from the viewpoint of the wireless device 240. The embodiments related to the wireless device 240 relate to FIGS. 6 and 8.

FIG. 6 was described above and is a flowchart that describes actions of a method for suspending the connection 251 according to embodiments herein. Actions 601, 602 and 603b are performed by the wireless device 240.

Figure 8:
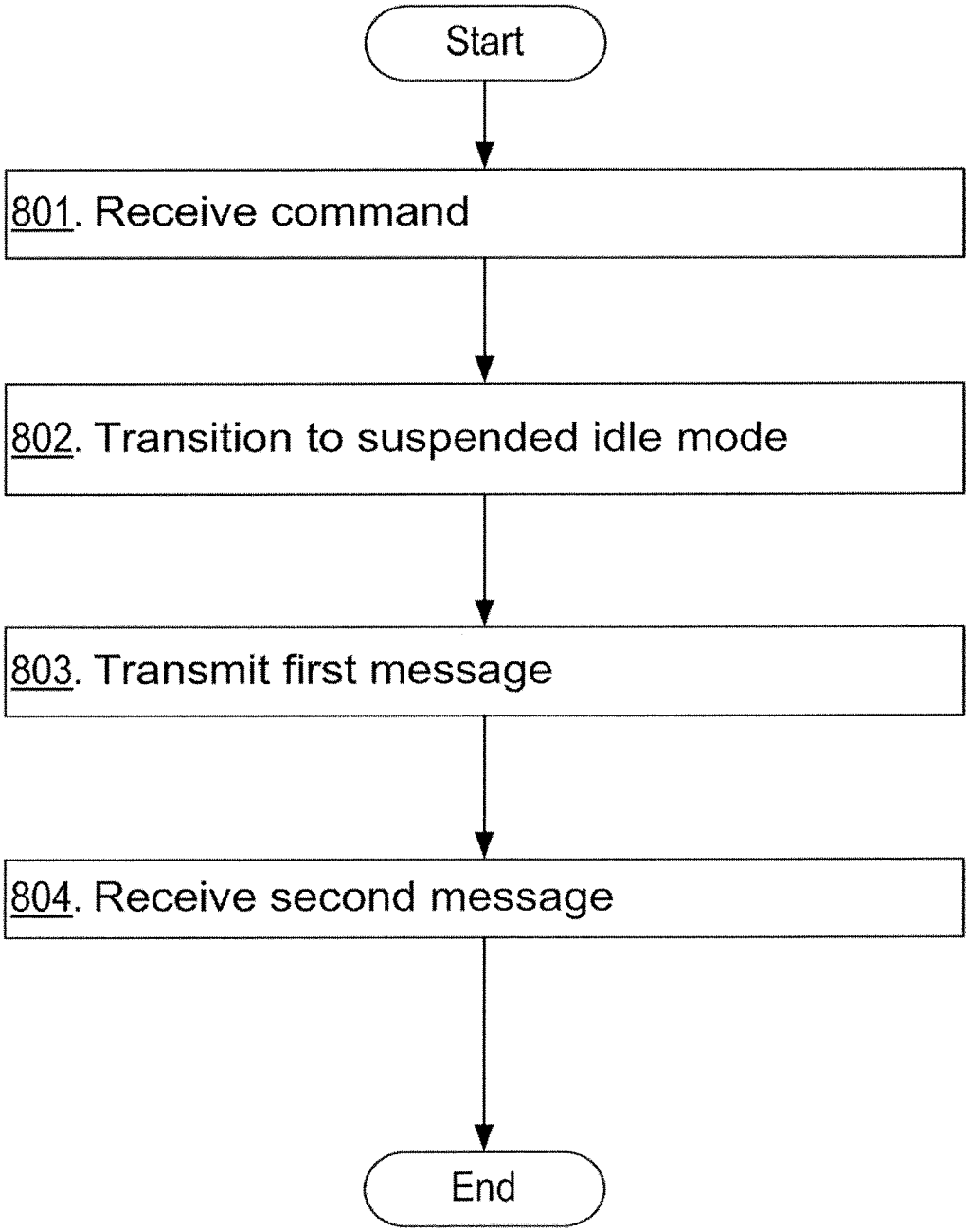
FIG. 8 is a flowchart illustrating embodiments of a method performed by a wireless device.

FIG. 8 is a flowchart that describes actions of a method for suspending and resuming the connection 251 according to embodiments herein. Actions 801-804 are related to FIG. 8 and are performed by the wireless device 240. FIGS. 6 and 8 complement each other.

Action 801

The wireless device 240 receives from the first network node 211 the command to transition from the connected mode into the suspended mode.

In other words, the wireless device receives the command from the first network node 211 to transition into the suspended idle mode, in which suspended idle mode the wireless device 240 has stored the UE context related to the connection 251, and the resume identifier of the wireless device 240 for resuming the connection 251 later.

This action may be performed when the first network node 211 has obtained an indication that the connection 251 between the wireless device 240 and the wireless communications network 200 is to be suspended or released. In some embodiments this action is performed if the request to deactivate the UE context has been accepted by the second network node 212.

The received command may further comprise a command to store a resume area. The resume area indicates in which area, i.e. in which cells, that the resumption is valid.

This action may be performed by means such as a receiving module 1210 in the wireless device 240. The receiving module 1210 may be implemented by a receiver in the wireless device 240.

This action is related to actions 504 and 706 above.

Action 802

The wireless device 240 transitions into the suspended mode, in which suspended mode the connection 251 is suspended and the wireless device 240 stores data 260 related to the connection, and further stores an identifier 270 of the wireless device 240 for locating the stored data 260 related to the connection 251 later.

In other words, the wireless device 240 transitions into the suspended idle mode. This action may be performed by means such as a transitioning module 1220 in the wireless device 240. The transitioning module 1220 may be implemented by a processor 1280 in the wireless device 240.

Action 601

After some time, the wireless device 240 obtains an indication to contact the wireless communications network 200. Such an indication may be a paging message from the second network node 212. Thus, the wireless device 240 wants to contact the wireless communications network 200 or in other words the wireless device 240 wants to establish a new connection.

Action 602

The wireless device 240 may check if it supports suspend and/or resume. It may further check whether the identifier 270 of the wireless device 240 is valid.

Action 603b

If the wireless device 240 does not support suspend and/or resume or if the identifier 270 of the wireless device 240 is not valid, then the wireless device 240 may do a normal service establishment.

Actions 603a, 803

The wireless device 240 transmits a message to the first network node 211, which transmitted message indicates a request to resume the connection 251 and which message comprises the identifier 270 of the wireless device 240.

In other words, the wireless device 240 transmits a message to the first network node 211 when the wireless device 240 wants to establish a new connection. The message indicates that the wireless device 240 wants to establish the new connection 251 and comprises the resume identifier of the wireless device 240. The message may be transmitted when the wireless device 240 wants to establish the new connection 251.

The transmitted message to the first network node 211 may be a Random Access RA message.

This action may be performed by a transmitting module 1230 in the wireless device 240. The transmitting module 1230 may be implemented by a transmitter in the wireless device 240.

This action is related to actions 603a and 707 above.

Action 804

The wireless device 240 receives a message from the first network node 211, in response to the transmitted message. The received message comprises the identifier 270 of the wireless device 240 and an indication that the resumption of the connection 251 is complete, whereby the suspended connection 251 between the wireless device 240 and the wireless communications network 200 is resumed using the data 260 related to the suspended connection 251.

In other words, the wireless device 240 receives a control message from the first network node 211 in response to the transmitted message. The control message comprises the resume identifier of the wireless device 240 and the indication that the resumption of the connection 251 is complete, whereby the connection 251 between the wireless device 240 and the wireless communications network 200 is resumed using the UE context.

The wireless device 240 transitions into connected mode in response to the received message. E.g. the wireless device 240 turns on encryption and in the connected mode the wireless device 240 is prepared to send uplink messages if scheduled, and prepared to receive downlink messages. The previous bearer configuration is active.

This action may be performed by the receiving module 1210 in the wireless device 240.

This action is related to actions 606a and 708 above.

Embodiments will now be described from the viewpoint of the second network node 212. The embodiments related to the second network node 212 relate to FIG. 9.

Figure 9:
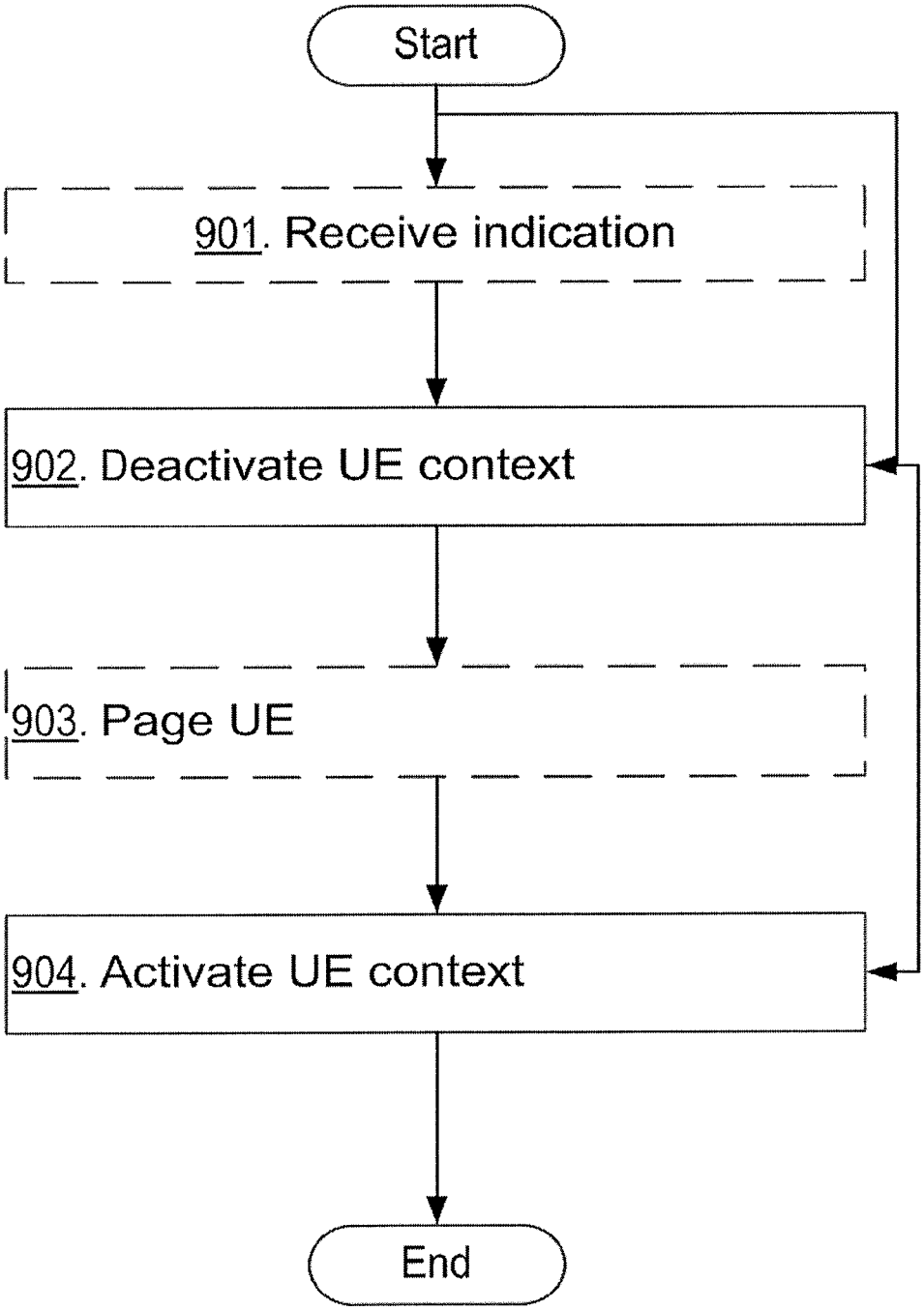
FIG. 9 is a flowchart illustrating embodiments of a method performed by a second network node.
Figure 9A:
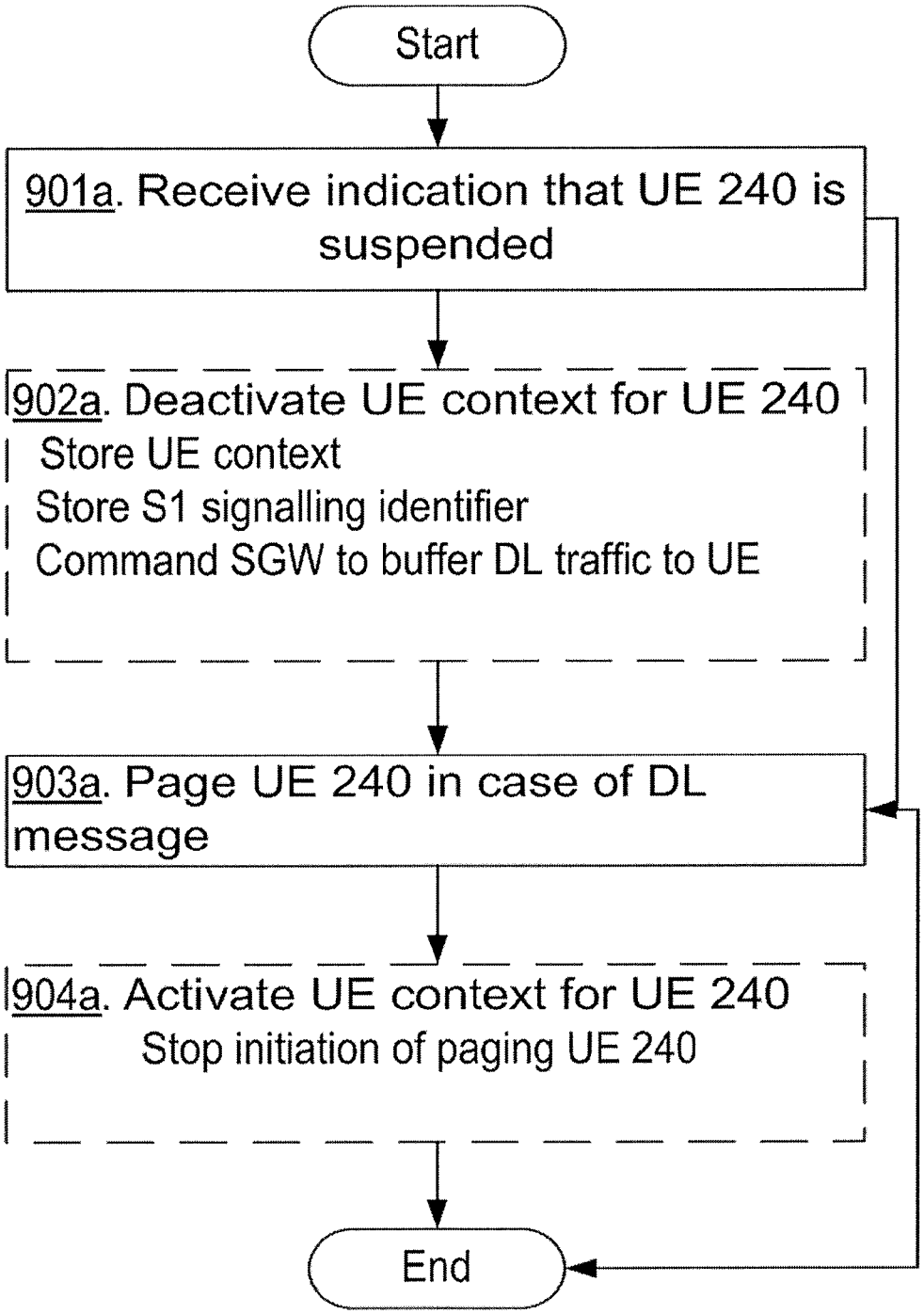
FIG. 9a is a flowchart illustrating further embodiments of a method performed by a second network node.

FIGS. 9 and 9a are flowcharts that describe actions of a method for handling, i.e. suspending and resuming, the connection 251 according to embodiments herein. FIG. 9a is somewhat more detailed than FIG. 9.

As mentioned above the second network node 212 is responsible for paging the wireless device 240.

Action 901

The second network node 212 obtains an indication that the connection 251 between the wireless device 240 and the wireless communications network 200 is to be suspended.

This action may be performed by means such as a receiving module 1310 in the second network node 212. The receiving module 1310 may be implemented by a receiver in the second network node 212.

This action is related to actions 502a and 703 above.

Action 902

In order for the wireless device 240 to be able to be suspended the second network node 212 may deactivate the data 260 related to the connection 251. The deactivating of the stored data 260 related to the connection 251 further comprises paging the wireless device 240 in case of a downlink control message or a payload is to be transferred to the wireless device 240.

The deactivation may be performed in response to an indication that the connection between the wireless device 240 and the wireless communications network 200 is to be suspended.

The deactivating the data 260 related to the connection 251 may further comprise storing the data 260 related to the connection 251. The deactivating the data 260 related to the connection 251 may further comprises storing a security part of the data 260 related to the connection 251.

The deactivating the data 260 related to the connection 251 may further comprises storing a S1 signaling identifier.

The deactivating the stored data 260 related to the connection 251 may further comprise commanding the third network node 213 to buffer DL traffic to the wireless device 240.

This action may be performed by means such as a deactivating module 1320 in the second network node 212. The deactivating module 1320 may be implemented by a processor 1380 in the second network node 212.

Action 903

As a result of the deactivation of the data 260 related to the connection 251 the second network node 212 pages the wireless device 240 in case of a downlink control message is to be transferred to the wireless device 240 or when the third network node 213 has informed the second network node 212 that a payload is to be transferred to the wireless device 240.

The paging may be performed with a resume identifier. The resume identifier may be obtained from the indication that the connection 251 between the wireless device 240 and wireless communications network 200 is to be suspended.

This action may be performed by means such as a paging module 1330 in the second network node 212. The paging module 1330 may be implemented by the processor 1380 in the second network node 212.

Action 904

When the second network node 212 has obtained the indication that the wireless device 240 wants to or has resumed the connection 251 again, which was described above in relation to actions 606b and 709, the second network node 212 activates the stored data 260 related to the connection 251 in response to the indication that the wireless device 240 wants to or has resumed the connection 251 again. Thereby the connection 251 between the wireless device 240 and the wireless communications network 200 is resumed using the data related to the connection 251.

The the second network node 212 may activate the stored data related to the connection 251 by stopping the initiation of paging of the wireless device 240 in case of a downlink control message is to be transferred to the wireless device 240 or in case of a payload is to be transferred to the wireless device 240. That is, the second network node 212 determines that it shall not page the wireless device 240 anymore.

The activation may further comprise commanding the third network node 213 to stop buffering downlink traffic to the wireless device 240 and to send buffered downlink traffic to the wireless device 240.

This action may be performed by means such as an activating module 1340 in the second network node 212. The activating module 1340 may be implemented by the processor 1380 in the second network node 212.

This action is related to actions 606a and 709 above and to action 1003 below.

Embodiments will now be described from the viewpoint of the third network node 213. The embodiments related to the third network node 213 relate to FIG. 10.

Figure 10:
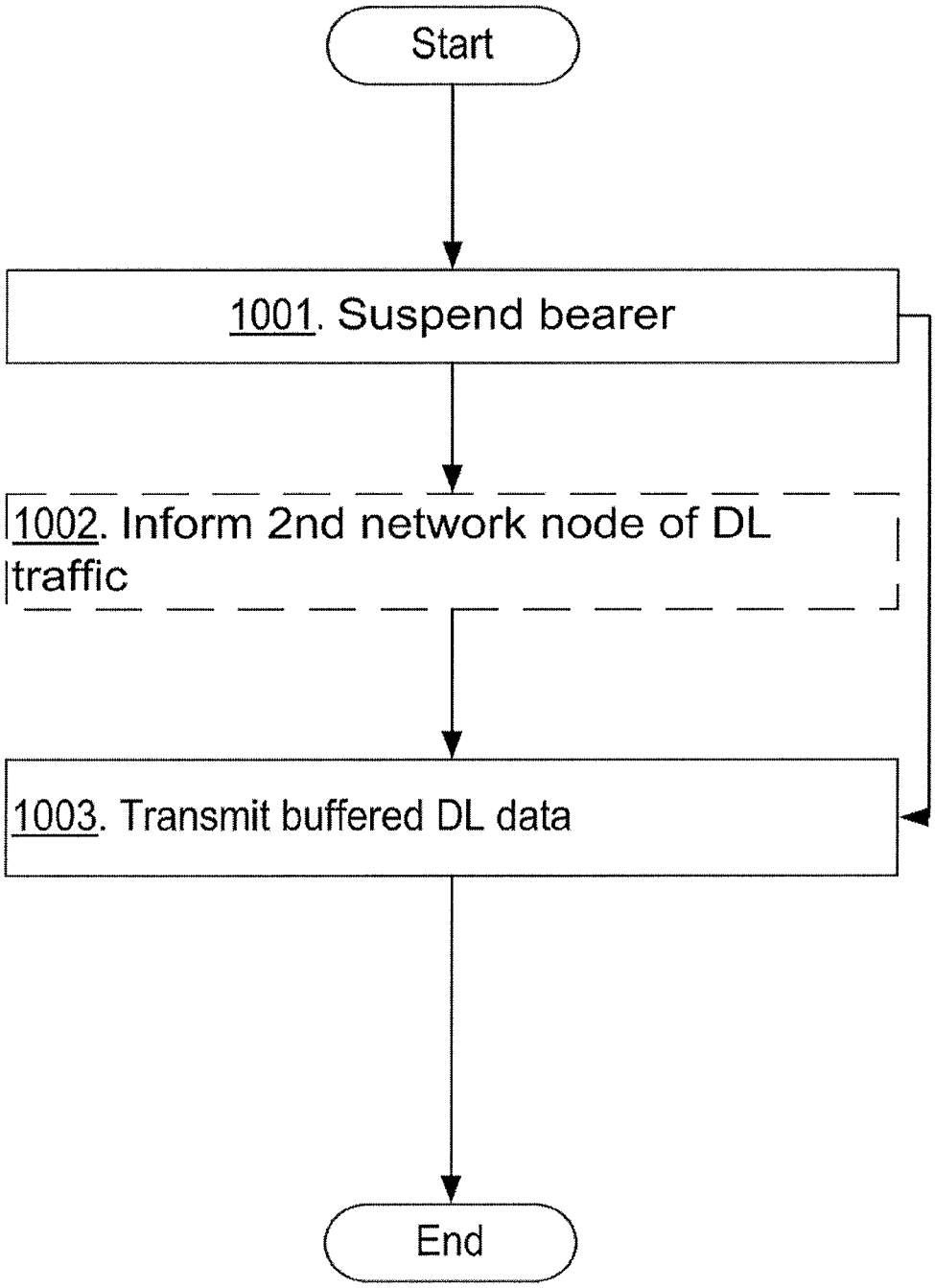
FIG. 10 is a flowchart illustrating embodiments of a method performed by a third network node.
Figure 10A:
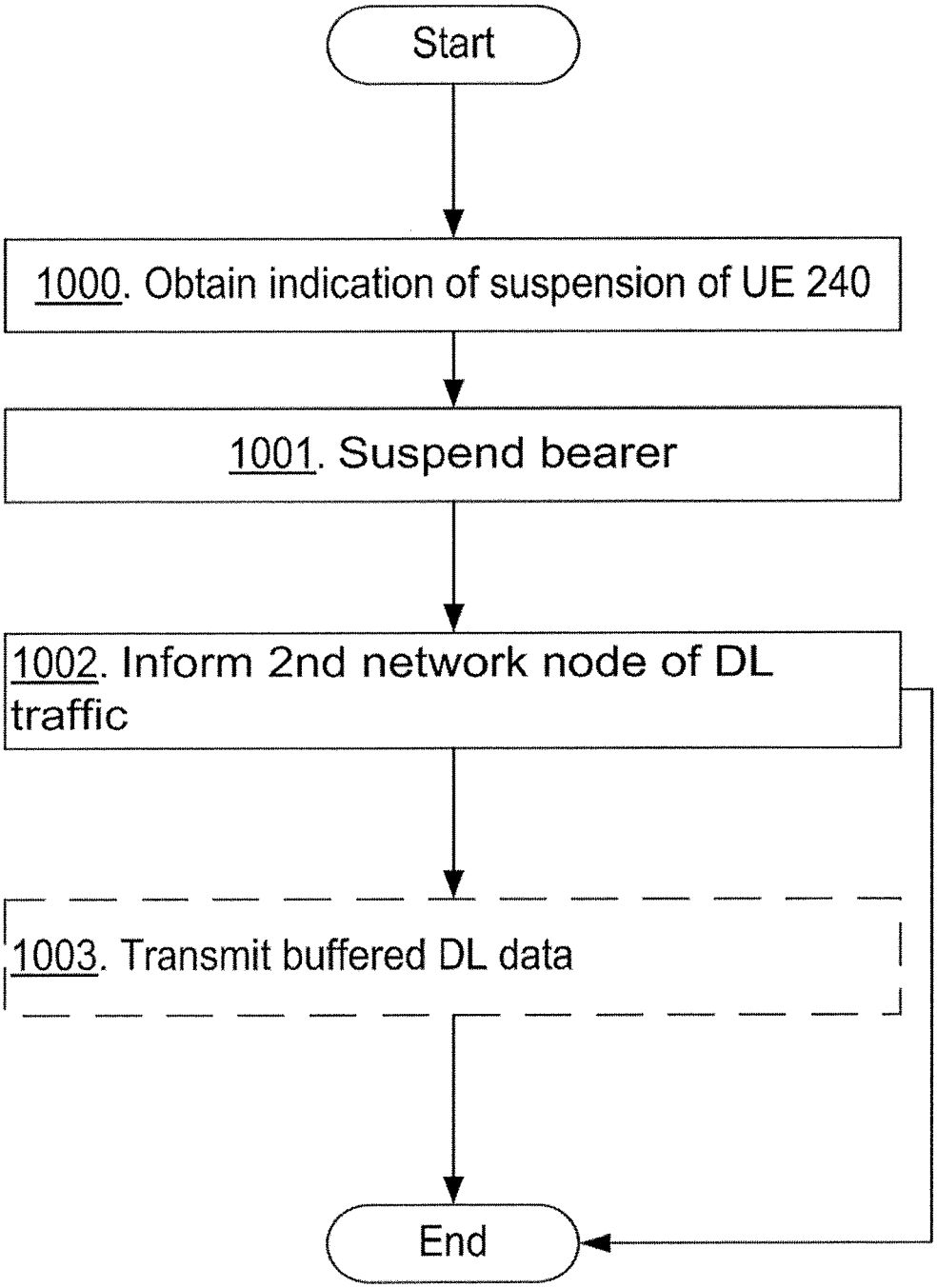
FIG. 10a is a flowchart illustrating further embodiments of a method performed by a third network node.

FIGS. 10 and 10a are flowcharts that describe actions of a method for handling, i.e. suspending and resuming, the connection 251 according to embodiments herein. The method is performed by the third network node 213. FIG. 10a complements FIG. 10 and discloses the additional action 1000.

As mentioned above the third network node 213, e.g. an SGW, may be responsible for forwarding downlink data packages to the wireless communications device 240.

Action 1000

The third network node 213 obtains an indication that the connection 251 between the wireless device 240 and the wireless communications network 200 is to be suspended.

This action is related to actions 505a and 704 above.

Action 1001

In order for the wireless device 240 to be able to be suspended the third network node 213 suspends a bearer related to the wireless device 240 in response to the indication that the connection 251 between the wireless device 240 and the wireless communications network is to be suspended. Suspending the bearer comprises buffering downlink payload to be sent to the wireless device 240 using the bearer.

This action may be performed by means such as a suspending module 1410 in the third network node 213. The suspending module 1410 may be implemented by a processor 1480 in the third network node 213.

Action 1002

When the third network node 213 has received downlink payload to the wireless device 240 for which the bearer is suspended, the third network node 213 informs the second network node 212 that the third network node 213 has received downlink payload to the wireless device 240.

The indication that the connection 251 between the wireless device 240 and the wireless communications network 200 is to be suspended, received above in action 1000, may comprise an indication that the third network node 213 shall inform the second network node 212 that the third network node 213 has received downlink payload to the wireless device 240.

This action is performed in order to get the second network node 212 to page the wireless device 240. The paging leads to that the wireless device 240 becomes active again and the downlink data may be transferred.

The bearers in the third network node 213 are originally setup by the second network node 212 and there is a 'connection' between the data 260 related to the connection 251 stored in the second network node 212, e.g. a UE context in an MME, and the data related to a bearer which is related to the wireless device 240 and stored in the third network node 213, e.g. a bearer context in an SGW. When the third network node 213 has received the indication of suspension related to the wireless device 240, this indicates that the second network node 212 must be signalled if downlink data is received in the third network node 213 on the concerned bearers.

This action may be performed by means such as an informing module 1420 in the third network node 213. The informing module 1420 may be implemented by the processor 1480 and/or a transmitter in the third network node 213.

This action is related to action 903 above.

Action 1003

When the third network node 213 receives an indication that the wireless device 240 has resumed the connection 251 again, as described above in actions 608a and 710 or action 904, the third network node 213 may transmit the buffered downlink payload to the wireless device 240. For example, the third network node 213 may have received a command from the second network node 212 to stop buffering downlink traffic to the wireless device 240 and to send buffered downlink traffic to the wireless device 240 in action 904.

The third network node 213 may transmit the buffered downlink payload in response to the indication that the wireless device 240 has resumed the connection 251 again. Thereby the connection 251 between the wireless device 240 and the wireless communications network 200 is resumed using the bearer related to the wireless device 240, i.e. the bearer used for the last connection 251.

This action may further comprise stopping the initiation of the buffering of downlink data traffic to the wireless device 240.

This action may be performed by means such as a transmitting module 1430 in the third network node 213. The transmitting module 1430 may be implemented by the transmitter in the third network node 213.

This action is related to actions 608a, 710 and 904 above.

Embodiments herein may be performed in the first network node 211. The first network node 211 may comprise the modules mentioned above and depicted in FIG. 11 for handling the connection 251.

Figure 11:
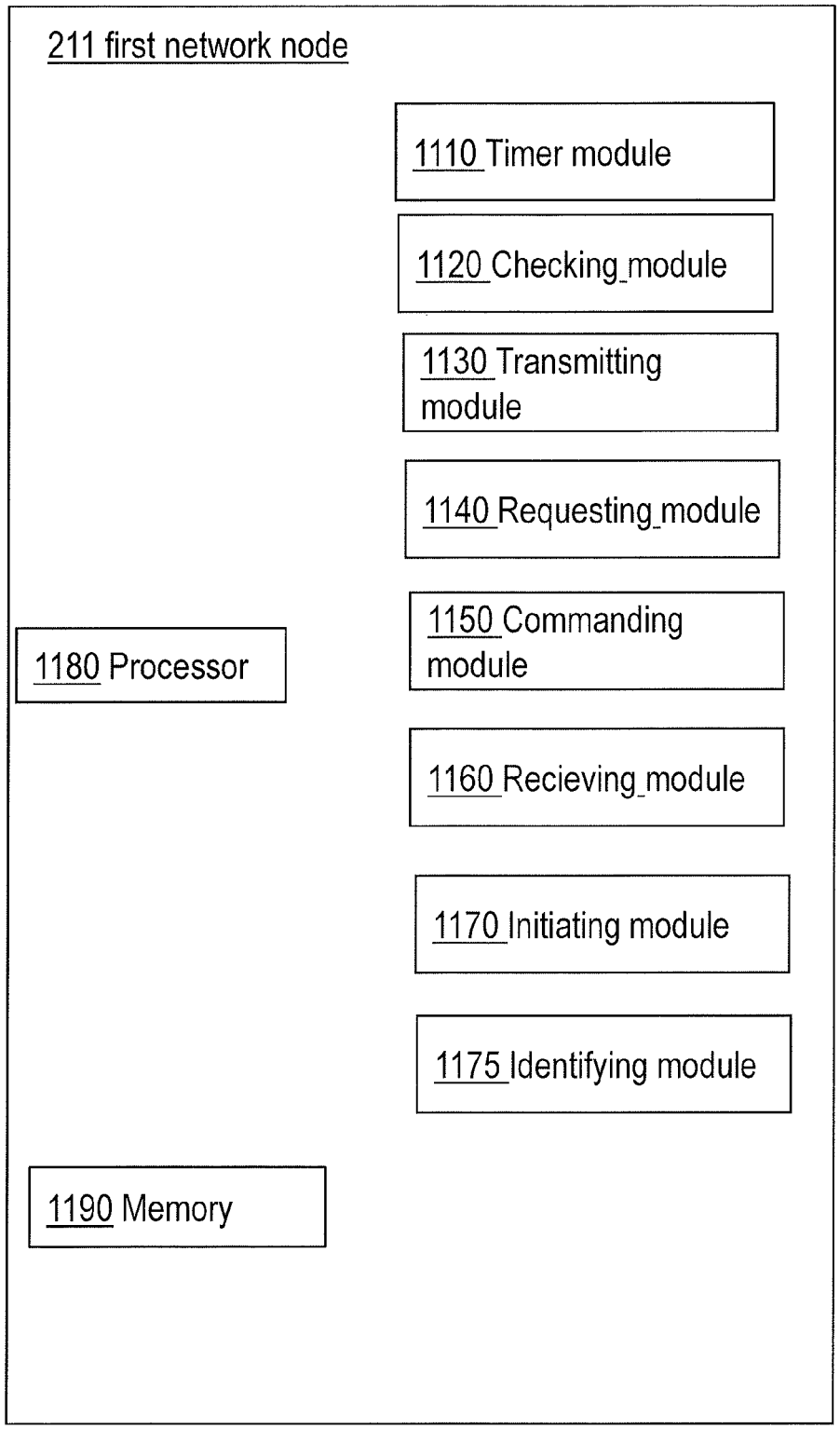
FIG. 11 is a schematic block diagram illustrating embodiments of a first network node.

In other words, to perform the method actions for handling the connection 251 between the wireless device 240 and the wireless communications network 200 described above in relation to FIG. 3-7, the first network node 211 comprises the following arrangement depicted in FIG. 11.

Figure 15:
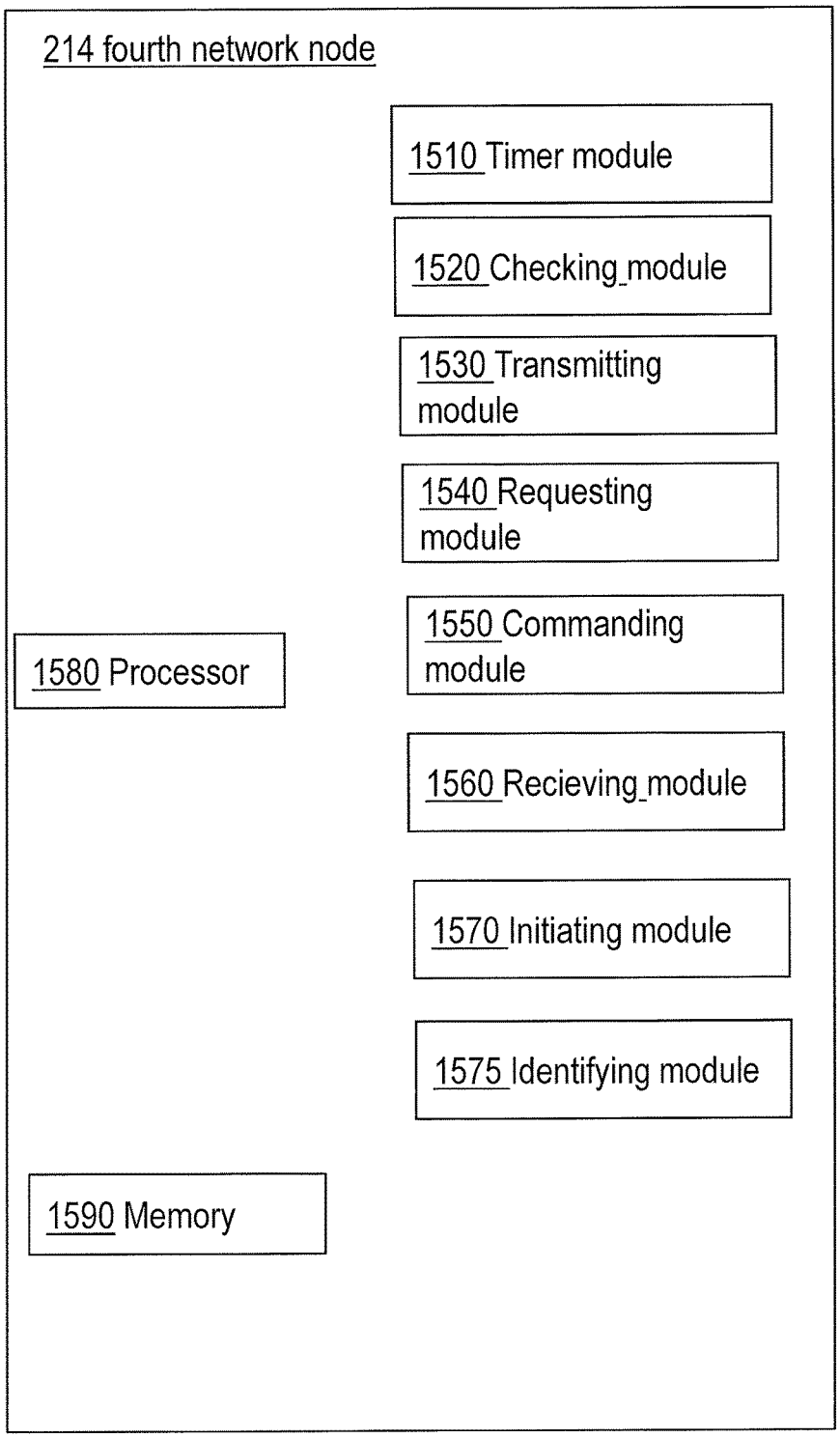

Further, embodiments herein may be performed in the system 216 of network nodes 211, 214 comprising the first network node 211 and the fourth network node 214. Then the fourth network node 214 may comprise any of the modules comprised in the first network node 211 mentioned above and depicted in FIG. 11 for handling the connection 251. Particularly, the fourth network node 214 may comprise a receiving module 1560 and a transmitting module 1530 as depicted in FIG. 15. The fourth network node 214 may be configured to perform any of the actions performed by the first network node 211, such as the actions of receiving and transmitting messages to the wireless device 240.

The first network node 211 is configured to, e.g. by means of the memory 1190 configured to, store data 260 related to the connection 251, and further to store an identifier 270 of the wireless device 240 for locating the stored data 260 related to the connection 251 later.

The first network node 211 is further configured to, e.g. by means of the commanding module 1150 configured to, provide the wireless device 240 with the command to transition from the connected mode into the suspended mode. In the suspended mode the connection 251 is suspended and the wireless device 240 stores the data 260 related to the connection 251, and further stores the identifier 270 of the wireless device 240 for resuming the connection 251 later.

The first network node 211 may further be configured to, e.g. by means of the receiving module 1160 configured to, receive a message from the wireless device 240. The received message indicates the request from the wireless device 240 to resume the connection. The received message further comprises the identifier 270 of the wireless device 240. The identifier 270 enables the first network node 211 to identify the data 260 related to the connection 251.

The first network node 211 may further be configured to, e.g. by means of the transmitting module 1130 configured to, resume the connection 251 by being configured to transmit a message to the wireless device 240, which transmitted message comprises the identifier 270 of the wireless device 240. The transmitted message further comprises an indication that the resumption of the connection 251 is complete, whereby the suspended connection 251 between the wireless device 240 and the wireless communications network 200 is resumed using the data 260 related to the suspended connection.

The first network node 211 may further be configured to, e.g. by means of an identifying module 1175 configured to, identify the stored data 260 related to the connection based on the received identifier 270 of the wireless device 240.

The first network node 211 may comprise the memory 1190 comprising one or more memory units. The memory 1190 is configured to store information obtained from for example the wireless communications device 240, the second network node 212 and the third network node 213. Such information may be information related to the connection 251, the wireless device 240, and bearers related to the wireless device 240. The data 260 related to the connection 251 and the identifier 270 of the wireless device 240 are examples of such information.

The memory 1190 may also store configurations, schedulings and applications etc. to perform the methods herein when being executed in the first network node 211.

The embodiments herein for handling the connection 251 between the wireless device 240 and the wireless communications network 200 may be implemented through one or more processors, such as the processor 1180 in the first network node 211 depicted in FIG. 11 together with computer program code for performing the functions and actions of the embodiments herein. The program code mentioned above may also be provided as a computer program product 1191 for instance in the form of a data carrier carrying computer program code 1192 for performing the embodiments herein when being loaded into the first network node 211. One such carrier may be in the form of a CD ROM disc. It is however feasible with other data carriers such as a memory stick. The computer program code may furthermore be provided as pure program code on a server and downloaded to the first network node 211.

Thus, the methods according to the embodiments described herein for the first network node 211 may be implemented by means of a computer program product, comprising instructions, i.e., software code portions, which, when executed on at least one processor, cause the at least one processor to carry out the actions described herein, as performed by the first network node 211. The computer program product may be stored on a computer-readable storage medium. The computer-readable storage medium, having stored there on the computer program, may comprise the instructions which, when executed on at least one processor, cause the at least one processor to carry out the actions described herein, as performed by the first network node 211. In some embodiments, the computer-readable storage medium may be a non-transitory computer-readable storage medium.

Those skilled in the art will also appreciate that the timer module 1110, the checking module 1120, the transmitting module 1130, the requesting module 1140, the commanding module 1150, the receiving module 1160, the initiating module 1170 and the identifying module 1175 described above may refer to a combination of analogue and digital circuits, and/or one or more processors configured with software and/or firmware, e.g. stored in the memory 1190 that when executed by the one or more processors such as the processor 1180 perform as described above. One or more of these processors, as well as the other digital hardware, may be included in a single ASIC, or several processors and various digital hardware may be distributed among several separate components, whether individually packaged or assembled into a SoC.

Embodiments herein may be performed in the wireless device 240. The wireless device 240 may comprise the modules mentioned above and depicted in FIG. 12 for handling the connection 251.

Figure 12:
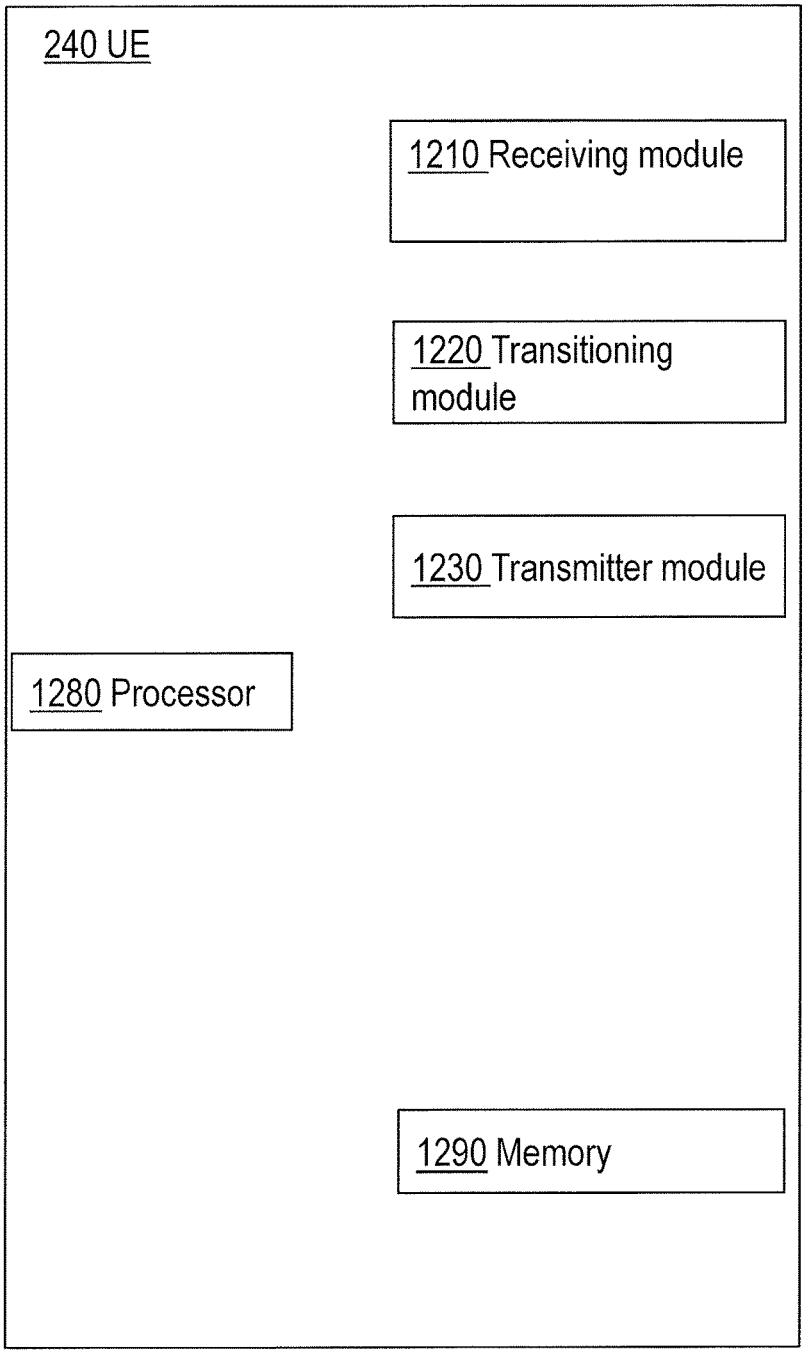
FIG. 12 is a schematic block diagram illustrating embodiments of a wireless device.

In other words, to perform the method actions for handling the connection 251 between the wireless device 240 and the wireless communications network 200 described above in relation to FIG. 3, FIG. 4a-c, FIG. 6 and FIG. 8, the wireless device 240 comprises the following arrangement depicted in FIG. 12.

The wireless device 220 is configured to, e.g. by means of the receiving module 1210 configured to, receive from the first network node 211 the command to transition from the connected mode into the suspended mode.

The wireless communications device 240 is further configured to, e.g. by means of the transitioning module 1220 configured to, transition into the suspended mode. In the suspended mode the connection 251 is suspended and the wireless device 240 stores data 260 related to the connection 251, and further stores an identifier 270 of the wireless device 240 for locating the stored data 260 related to the connection 251 later.

The network node 211 may be further configured to, e.g. by means of the transmitting module 1230 configured to, transmit a message to the first network node 211. The transmitted message indicates the request to resume the connection 251. The message comprises the identifier 270 of the wireless device 240.

The network node 211 may be further configured to, e.g. by means of the receiving module 1210 configured to, receive a message from the first network node 211, in response to the transmitted message. The received message comprises the identifier 270 of the wireless device 240 and an indication that the resumption of the connection 251 is complete.

The wireless communications device 240 may further comprise a memory 1290 comprising one or more memory units. The memory 1290 is configured to store information obtained from for example the first network node 211, the second network node 212 and the third network node 213. Such information may be information related to the connection 251, the wireless device 240, and bearers related to the wireless device 240. The data 260 related to the connection 251 and the identifier 270 of the wireless device 240 are examples of such information.

The memory 1290 may also store configurations, schedulings and applications etc. to perform the methods herein when being executed in the wireless communications device 240.

The embodiments herein for handling the connection 251 between the wireless device 240 and the wireless communications network 200 may be implemented through one or more processors, such as the processor 1280 in the wireless device 240 depicted in FIG. 12 together with computer program code for performing the functions and actions of the embodiments herein. The program code mentioned above may also be provided as a computer program product 1291 for instance in the form of a data carrier carrying computer program code 1292 for performing the embodiments herein when being loaded into the wireless device 240. One such carrier may be in the form of a CD ROM disc. It is however feasible with other data carriers such as a memory stick. The computer program code may furthermore be provided as pure program code on a server and downloaded to the wireless device 240.

Thus, the methods according to the embodiments described herein for the wireless device 240 may be implemented by means of a computer program product, comprising instructions, i.e., software code portions, which, when executed on at least one processor, cause the at least one processor to carry out the actions described herein, as performed by the wireless device 240. The computer program product may be stored on a computer-readable storage medium. The computer-readable storage medium, having stored there on the computer program, may comprise the instructions which, when executed on at least one processor, cause the at least one processor to carry out the actions described herein, as performed by the wireless communications device 240. In some embodiments, the computer-readable storage medium may be a non-transitory computer-readable storage medium.

Those skilled in the art will also appreciate that the receiving module 1210, the transitioning module 1220 and the transmitting module 1230 described above may refer to a combination of analogue and digital circuits, and/or one or more processors configured with software and/or firmware, e.g. stored in the memory 1290 that when executed by the one or more processors such as the processor 1280 perform as described above. One or more of these processors, as well as the other digital hardware, may be included in a single ASIC, or several processors and various digital hardware may be distributed among several separate components, whether individually packaged or assembled into a SoC.

Embodiments herein may be performed in the second network node 212. The second network node 212 may comprise the modules mentioned above and depicted in FIG. 13 for handling the connection 251.

Figure 13:
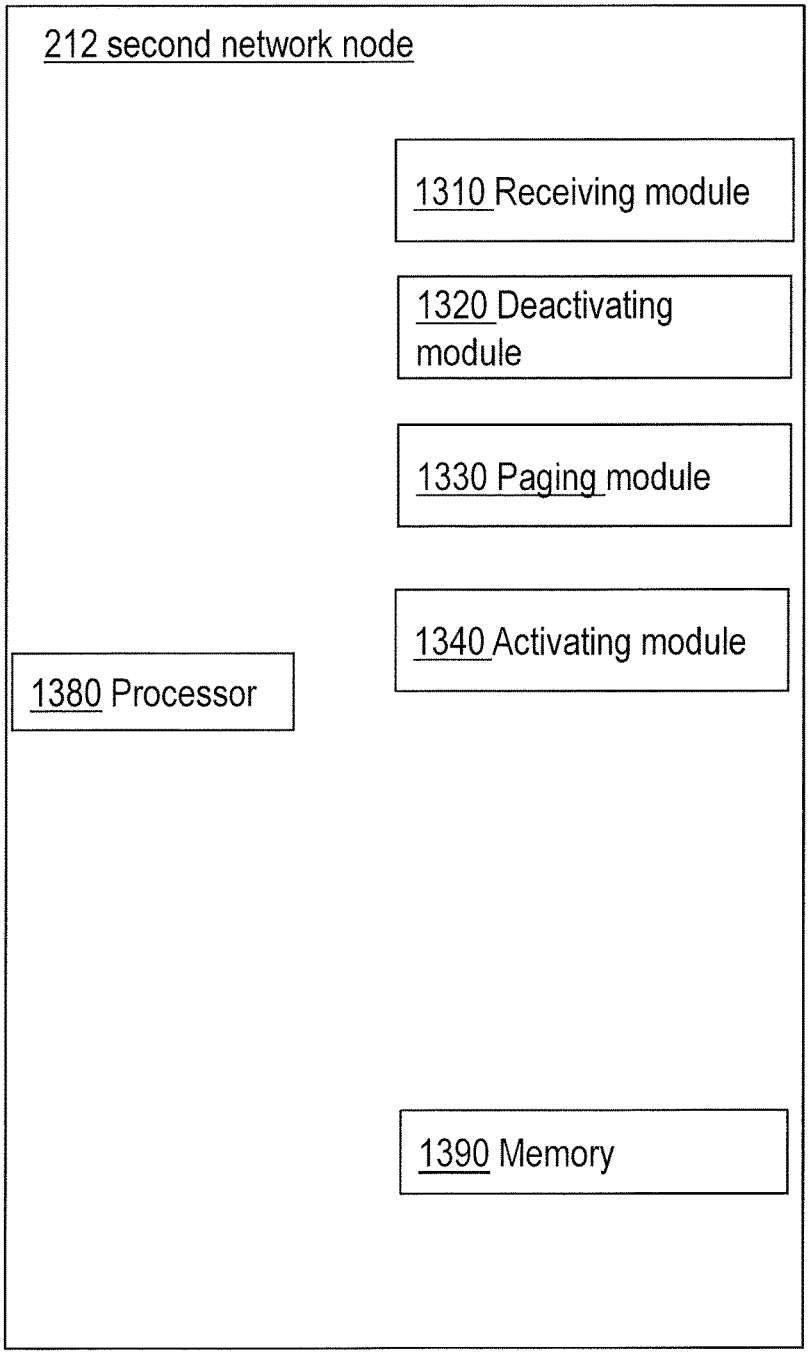
FIG. 13 is a schematic block diagram illustrating embodiments of a second network node.

In other words, to perform the method actions for handling the connection 251 between the wireless device 240 and the wireless communications network 200 described above in relation to FIG. 9, the second network node 212 comprises the following arrangement depicted in FIG. 13.

The second network node 212 is configured to, e.g. by means of the receiving module 1110 configured to, obtain an indication that the connection 251 between the wireless device 240 and the wireless communications network 200 is to be suspended.

The second network node 212 is further configured to, e.g. by means of the paging module 1130 configured to, page the wireless device 240 in case of a downlink control message is to be transferred to the wireless device 240 or when the third network node 213 has informed the second network node 212 that a payload is to be transferred to the wireless device 240.

The second network node 212 may further be configured to, e.g. by means of the memory 1390 configured to, store data 260 related to the connection 251.

The second network node 212 may further be configured to, e.g. by means of the activating module 1140 configured to, activate the stored data 260 related to the connection 251 in response to the indication that the wireless device 240 wants to or has resumed the connection 251 again. Thereby the connection 251 between the wireless device 240 and the wireless communications network 200 is resumed using the data 260 related to the connection 251.

The second network node 212 may be configured to activate the stored data 260 related to the connection 251 by being configured to stop initiation of paging of the wireless device 240 in case of a downlink control message is to be transferred to the wireless device 240 or in case of a payload is to be transferred to the wireless device 240.

The second network node 212 may comprise the memory 1390 comprising one or more memory units. The memory 1390 is configured to store information obtained from for example the wireless communications device 240, the first network node 211 and the third network node 213. Such information may be information related to the connection 251, the wireless device 240, and bearers related to the wireless device 240. The data 260 related to the connection 251 and the identifier 270 of the wireless device 240 are examples of such information.

The memory 1390 may also store configurations, schedulings and applications etc. to perform the methods herein when being executed in the second network node 212.

The embodiments herein for handling the connection 251 between the wireless device 240 and the wireless communications network 200 may be implemented through one or more processors, such as the processor 1380 in the second network node 212 depicted in FIG. 13 together with computer program code for performing the functions and actions of the embodiments herein. The program code mentioned above may also be provided as a computer program product 1391 for instance in the form of a data carrier carrying computer program code 1392 for performing the embodiments herein when being loaded into the second network node 212. One such carrier may be in the form of a CD ROM disc. It is however feasible with other data carriers such as a memory stick. The computer program code may furthermore be provided as pure program code on a server and downloaded to the second network node 212.

Thus, the methods according to the embodiments described herein for the second network node 212 may be implemented by means of a computer program product, comprising instructions, i.e., software code portions, which, when executed on at least one processor, cause the at least one processor to carry out the actions described herein, as performed by the second network node 212. The computer program product may be stored on a computer-readable storage medium. The computer-readable storage medium, having stored there on the computer program, may comprise the instructions which, when executed on at least one processor, cause the at least one processor to carry out the actions described herein, as performed by the second network node 212. In some embodiments, the computer-readable storage medium may be a non-transitory computer-readable storage medium.

Those skilled in the art will also appreciate that the receiving module 1310, the deactivating module 1320, the paging module 1330 and the activating module 1340 described above may refer to a combination of analogue and digital circuits, and/or one or more processors configured with software and/or firmware, e.g. stored in the memory 1390 that when executed by the one or more processors such as the processor 1380 perform as described above. One or more of these processors, as well as the other digital hardware, may be included in a single ASIC, or several processors and various digital hardware may be distributed among several separate components, whether individually packaged or assembled into a SoC.

Embodiments herein may be performed in the third network node 213. The third network node 213 may comprise the modules mentioned above and depicted in FIG. 14 for handling the connection 251.

Figure 14:
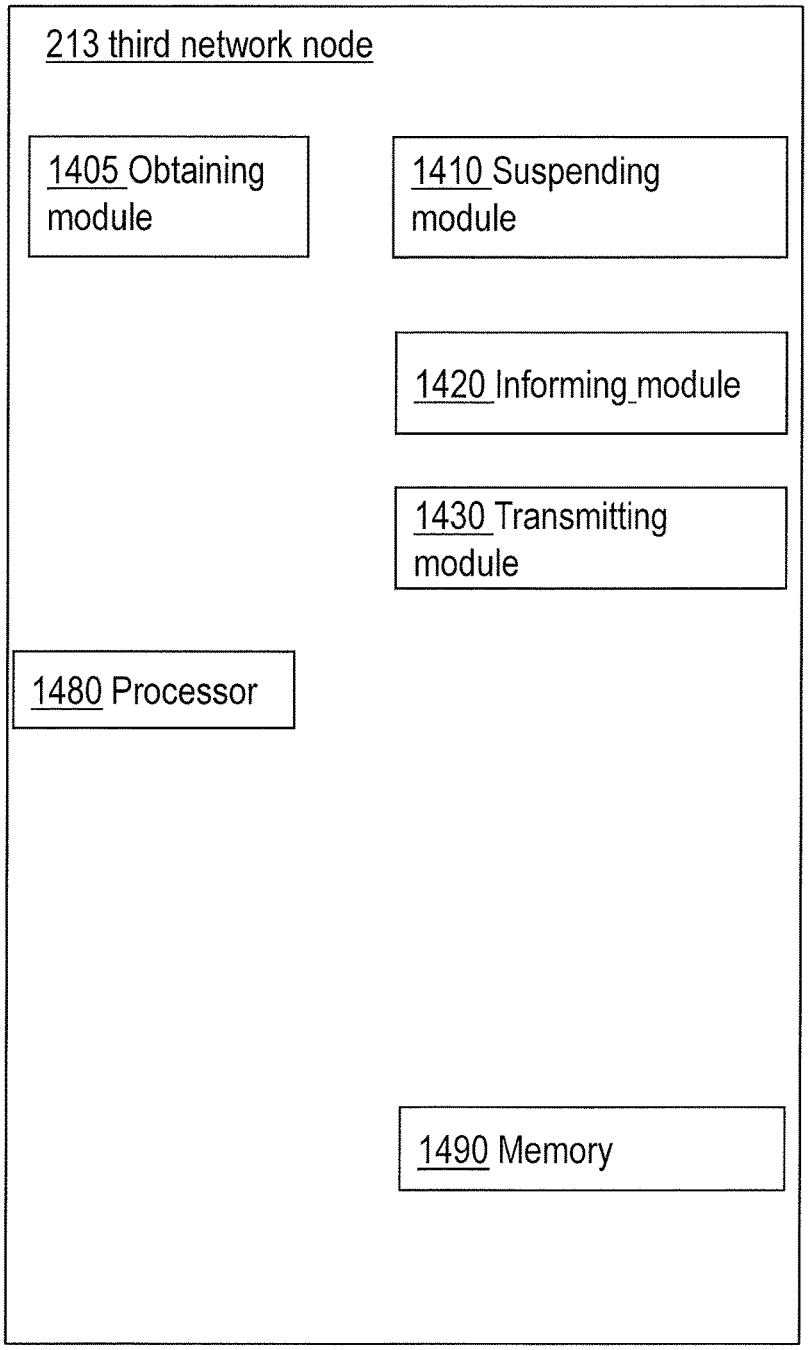
FIG. 14 is a schematic block diagram illustrating embodiments of a third network node.

In other words, to perform the method actions for handling the connection 251 between the wireless device 240 and the wireless communications network 200 described above in relation to FIG. 10, the third network node 213 comprises the following arrangement depicted in FIG. 14.

The third network node 213 is configured to, e.g. by means of an obtaining module 1405 configured to, obtain an indication that the connection 251 between the wireless device 240 and the wireless communications network 200 is to be suspended.

The third network node 213 is further configured to, e.g. by means of the suspending module 1410 configured to, suspend the bearer related to the wireless device 240 in response to the indication that the connection 251 between the wireless device 240 and the wireless communications network is to be suspended. Suspending the bearer comprises buffering downlink payload to be sent to the wireless device 240 using the bearer.

The third network node 213 may further be configured to, e.g. by means of the informing module 1420 configured to, inform the second network node 212 that the third network node 213 has received downlink payload to the wireless device 240. This action is performed when the third network node 213 has received downlink payload to the wireless device 240 for which the bearer is suspended The third network node 213 may further be configured to, e.g. by means of the transmitting module 1430 configured to, transmit the buffered downlink payload to the wireless device 240 in response to an indication that the wireless device 240 has resumed the connection 251 again. Thereby the connection 251 between the wireless device 240 and the wireless communications network 200 is resumed using the bearer related to the wireless device 240.

The third network node 213 may comprise the memory 1490 comprising one or more memory units. The memory 1490 is configured to store information obtained from for example the wireless communications device 240, the second network node 212 and the first network node 211. Such information may be information related to the connection 251, the wireless device 240, and bearers related to the wireless device 240. The data 260 related to the connection 251 and the identifier 270 of the wireless device 240 are examples of such information.

The memory 1490 may also store configurations, schedulings and applications etc. to perform the methods herein when being executed in the third network node 213.

The embodiments herein for handling the connection 251 between the wireless device 240 and the wireless communications network 200 may be implemented through one or more processors, such as the processor 1480 in the third network node 213 depicted in FIG. 14 together with computer program code for performing the functions and actions of the embodiments herein. The program code mentioned above may also be provided as a computer program product 1491 for instance in the form of a data carrier carrying computer program code 1492 for performing the embodiments herein when being loaded into the third network node 213. One such carrier may be in the form of a CD ROM disc. It is however feasible with other data carriers such as a memory stick. The computer program code may furthermore be provided as pure program code on a server and downloaded to the third network node 213.

Thus, the methods according to the embodiments described herein for the third network node 213 may be implemented by means of a computer program product, comprising instructions, i.e., software code portions, which, when executed on at least one processor, cause the at least one processor to carry out the actions described herein, as performed by the third network node 213. The computer program product may be stored on a computer-readable storage medium. The computer-readable storage medium, having stored there on the computer program, may comprise the instructions which, when executed on at least one processor, cause the at least one processor to carry out the actions described herein, as performed by the third network node 213. In some embodiments, the computer-readable storage medium may be a non-transitory computer-readable storage medium.

Those skilled in the art will also appreciate that the obtaining module 1405, the suspending module 1410, the informing module 1420 and the transmitting module 1430 described above may refer to a combination of analogue and digital circuits, and/or one or more processors configured with software and/or firmware, e.g. stored in the memory 1490 that when executed by the one or more processors such as the processor 1480 perform as described above. One or more of these processors, as well as the other digital hardware, may be included in a single ASIC, or several processors and various digital hardware may be distributed among several separate components, whether individually packaged or assembled into a SoC.

As mentioned above embodiments herein provide a more efficient procedure to move the wireless device 240 from a state corresponding to RRC_IDLE state or mode to a state where data may be transferred to and from the wireless communications network 200 by reusing information from the previous session of the connection 251.

According to some embodiments herein it is provided a method in the first network node 211 for handling the connection 251 between the wireless device 240 and the wireless communications network 200. The first network 211 node may:

Obtain an indication that the connection 251 between the wireless device 240 and the wireless communications network is to be suspended or released;

Command the wireless device 240 to transition into a suspended idle mode, in which suspended idle mode the wireless device 240 has stored a UE context related to the connection 251, and a resume identifier of the wireless device 240 for resuming the connection 251 later;

Receive a first message from the wireless device 240, which first message indicates that the wireless device 240 wants to establish a new connection and which received message comprises the resume identifier of the wireless device 240;

Transmit a second message such as e.g. a control message to the UE in response to the received first message from the wireless device 240. The control message comprises the resume identifier of the wireless device 240 and an indication that a resumption of the connection 251 is complete, whereby the connection 251 between the wireless device 240 and the wireless communications network 200 is resumed using the UE context.

According to some other embodiments herein it is provided a method in the wireless device 240 for handling the connection 251 between the wireless device 240 and the wireless communications network 200. The wireless device 240 may:

Receive a command from the first network node 211 to transition into a suspended idle mode when the first network node 211 has obtained an indication that the connection 251 between the wireless device 240 and the wireless communications network 200 is to be released and/or suspended. In the suspended idle mode the wireless device 240 has stored a UE context related to the connection 251, and a resume identifier of the wireless device 240 for resuming the connection 251 later.

Transition into the suspended idle mode;

Transmit a first message to the first network node 211 when the wireless device 240 wants to establish a new connection. The message indicates that the wireless device 240 wants to establish the connection 251 and comprises the resume identifier of the wireless device 240.

Receive a second message such as a control message from the first network node 211 in response to the sent message. The control message comprises the resume identifier of the wireless device 240 and an indication that the resumption of the connection 251 is complete, whereby the connection 251 between the wireless device 240 and the wireless communications network 200 is resumed using the UE context.

According to some further embodiments herein it is provided a method in the second network node 212 for handling the connection 251 between the wireless device 240 and the wireless communications network 200. Then the wireless communications network 200 comprises the second network node 212. The second network node 212 may:

Deactivate a UE context, which UE context is related to the connection 251, in response to an indication that the connection 251 between the wireless device 240 and the wireless communications network 200 is to be suspended.

Activate the stored UE context again in response to an indication that the wireless device 240 wants to establish or has established the connection 251 again, whereby the connection 251 between the wireless device 240 and the wireless communications network 200 is resumed using the UE context used for the last connection 251.

According to some further embodiments herein it is provided a method in a third network node 213 for handling the connection 251 between the wireless device 240 and the wireless communications network 200. Then the wireless communications network 200 comprises the third network node 213. The third network node 213 may:

In response to an indication that the connection 251 between the wireless device 240 and the wireless communications network 200 is to be released/suspended, suspend a bearer associated with the wireless device 240. The suspending of the bearer comprises buffering DL data traffic to be sent to the wireless device 240 using the bearer.

Transmit the buffered DL data traffic to the wireless device 240 in response to an indication that the wireless device 240 has established the connection 251 again, whereby the connection 251 between the UE and the wireless communications network is resumed using the bearer used for the last connection 251.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first core network node and a second core network node should be considered to be non-limiting and does in particular not imply a certain hierarchical relation between the two.

The invention claimed is:

1. A method performed by a first network node for handling a *Radio Resource Control* (*RRC*) connection between a wireless device and a wireless communications network, which wireless communications network comprises the first network node, the method comprising:

storing data related to the *RRC* connection, and further storing an identifier of the wireless device for locating the stored data related to the *RRC* connection later, *the identifier of the wireless device comprising a radio network temporary identifier* (*RNTI*);

providing the wireless device with a command to transition from a connected mode into a suspended mode, *the command comprising the identifier of the wireless device, and* in which suspended mode the *RRC* connection is suspended and the wireless device stores the data related to the *RRC* connection, and further stores the identifier of the wireless device for locating the stored data later when resuming the *RRC* connection;

receiving a message from the wireless device, which message indicates a request from the wireless device to resume the *RRC* connection and which received message comprises the identifier of the wireless device for locating the stored data, wherein the identifier enables the first network node to locate the data related to the *RRC* connection; and resuming the *RRC* connection by transmitting a message to the wireless device, which transmitted message comprises [the identifier of the wireless device, and further comprises] an indication that a resumption of the *RRC* connection is complete, whereby the suspended *RRC* connection between the wireless device and the wireless communications network is resumed using the data related to the suspended *RRC* connection.

2. The method according to claim 1, wherein the receiving further comprises:

locating the stored data related to the *RRC* connection based on the received identifier of the wireless device.

3. The method according to claim 1, wherein the data related to the *RRC* connection is a UE context related to the *RRC* connection and the wireless device.

4. The method according to claim 1, wherein the message received from the wireless device comprises an indication of whether or not to resume data bearers.

5. The method according to claim 1, wherein the wireless communications network is a Long Term Evolution, LTE, network;

the first network node is an evolved NodeB;

the wireless device is a User Equipment, UE; [ the connection is a Radio Resource Control, RRC, connection;] and messages between the first network node and the wireless device are transmitted with RRC signaling.

6. A first network node for handling a *Radio Resource Control* (*RRC*) connection between a wireless device and a wireless communications network, which wireless communications network comprises the first network node, the first network node is configured to:

store data related to the *RRC* connection, and further to store an identifier of the wireless device for locating the stored data related to the *RRC* connection later, *the identifier of the wireless device comprising a radio network temporary identifier* (*RNTI*);

provide the wireless device with a command to transition from a connected mode into a suspended mode, *the command comprising the identifier of the wireless device, and* in which suspended mode the *RRC* connection is suspended and the wireless device stores the data related to the *RRC* connection, and further stores the identifier of the wireless device for locating the stored data later when resuming the *RRC* connection;

receive a message from the wireless device, which received message indicates a request from the wireless device to resume the *RRC* connection and which received message comprises the identifier of the wireless device, wherein the identifier enables the first network node to identify the data related to the *RRC* connection; and resume the *RRC* connection by being configured to transmit a message to the wireless device, which transmitted message comprises [the identifier of the wireless device, and further comprises] an indication that a resumption of the *RRC* connection is complete, whereby the suspended *RRC* connection between the wireless device and the wireless communications network is resumed using the data related to the suspended *RRC* connection.

7. The first network node according to claim 6, further configured to:

identify the stored data related to the *RRC* connection based on the received identifier of the wireless device.

8. The first network node according to claim 6, wherein the data related to the *RRC* connection is a UE context related to the *RRC* connection and the wireless device.

9. The first network node according to claim 6, wherein the message received from the wireless device comprises an indication of whether or not to resume data bearers.

10. The first network node according to claim 6, wherein the wireless communications network is a Long Term Evolution, LTE, network;

the first network node is an evolved NodeB;

the wireless device is a User Equipment, UE; [ the connection is a Radio Resource Control, RRC, connection;] and messages between the first network node and the wireless device are transmitted with RRC signaling.

11. A method performed by a wireless device for handling a *Radio Resource Control* (*RRC*) connection between the wireless device and a wireless communications network, which wireless communications network comprises a first network node, the method comprising:

receiving from the first network node a command to transition from a connected mode into a suspended mode, *the command comprising an identifier of the wireless device, the identifier of the wireless device comprising a radio network temporary identifier* (*RNTI*);

transitioning into the suspended mode, in which suspended mode the *RRC* connection is suspended and the wireless device stores data related to the *RRC* connection, and further stores [an] *the* identifier of the wireless device for locating the stored data related to the *RRC* connection later when resuming the *RRC* connection;

transmitting a message to the first network node, which transmitted message indicates a request to resume the *RRC* connection and which transmitted message comprises the identifier of the wireless device; and receiving a message from the first network node, in response to the transmitted message, which received message comprises [the identifier of the wireless device and] an indication that a resumption of the *RRC* connection is complete, whereby the suspended *RRC* connection between the wireless device and the wireless communications network is resumed using the data related to the suspended *RRC* connection.

12. The method according to claim 11, wherein the data related to the *RRC* connection is a UE context related to the *RRC* connection and the wireless device.

13. The method according to claim 11, wherein the transmitted message comprises an indication of whether to resume data bearers.

14. The method according to claim 11, wherein the wireless communications network is an Long Term Evolution, LTE, network;

the first network node is an evolved NodeB;

the wireless device is a User Equipment, UE; [ the connection is a Radio Resource Control, RRC, connection;] and messages between the first network node and the wireless device are transmitted with RRC signaling.

15. A wireless device for handling a *Radio Resource Control* (*RRC*) connection between the wireless device and a wireless communications network, which wireless communications network comprises a first network node, the wireless device is configured to:

receive from the first network node a command to transition from a connected mode into a suspended mode, *the command comprising an identifier of the wireless device, the identifier of the wireless device comprising a radio network temporary identifier* (*RNTI*);

transition into the suspended mode, in which suspended mode the *RRC* connection is suspended and the wireless device stores data related to the *RRC* connection, and further stores [an] *the* identifier of the wireless device for locating the stored data related to the *RRC* connection later when resuming the *RRC* connection;

transmit a message to the first network node, which transmitted message indicates a request to resume the *RRC* connection and which message comprises the identifier of the wireless device; and receive a message from the first network node, in response to the transmitted message, which received message comprises [the identifier of the wireless device and] an indication that a resumption of the *RRC* connection is complete, whereby the suspended *RRC* connection between the wireless device and the wireless communications network is resumed using the data related to the *RRC* suspended connection.

16. The wireless device according to claim 15, wherein the data related to the *RRC* connection is a UE context related to the *RRC* connection and the wireless device.

17. The wireless device according to claim 15, wherein the transmitted message comprises an indication of whether to resume data bearers.

18. The wireless device according to claim 15, wherein the wireless communications network is an Long Term Evolution, LTE, network;

the first network node is an evolved NodeB;

the wireless device is a User Equipment, UE; [ the connection is a Radio Resource Control, RRC, connection;] and messages between the first network node and the wireless device are transmitted with RRC signaling.

* * * * *